(12) United States Patent
Rice et al.

(10) Patent No.: US 8,205,487 B2
(45) Date of Patent: Jun. 26, 2012

(54) PROBE MICROSCOPE SETUP METHOD

(75) Inventors: Alan F. Rice, Santa Barbara, CA (US); Lin Huang, Goleta, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 406 days.

(21) Appl. No.: 12/419,898

(22) Filed: Apr. 7, 2009

(65) Prior Publication Data

US 2009/0260113 A1 Oct. 15, 2009

Related U.S. Application Data

(62) Division of application No. 11/203,506, filed on Aug. 12, 2005, now Pat. No. 7,513,142.

(51) Int. Cl.
*G01Q 10/00* (2010.01)
*G01Q 10/06* (2010.01)
*G01Q 60/24* (2010.01)

(52) U.S. Cl. ............ 73/105; 850/1; 850/4; 850/33
(58) Field of Classification Search ............ 73/105; 850/1, 4, 33
See application file for complete search history.

(56) References Cited

U.S. PATENT DOCUMENTS

RE37,560 E * 2/2002 Elings .................. 310/316.01
* cited by examiner

*Primary Examiner* — Daniel Larkin
(74) *Attorney, Agent, or Firm* — Boyle Fredrickson, S.C.

(57) ABSTRACT

A scanning probe microscope and method of operation for monitoring and assessing proper tracking between the tip and sample, as well as automating at least some aspects of AFM setup previously done manually. Preferably, local slopes corresponding to the acquired data are compared to determine a tracking metric that is self-normalizing.

13 Claims, 28 Drawing Sheets

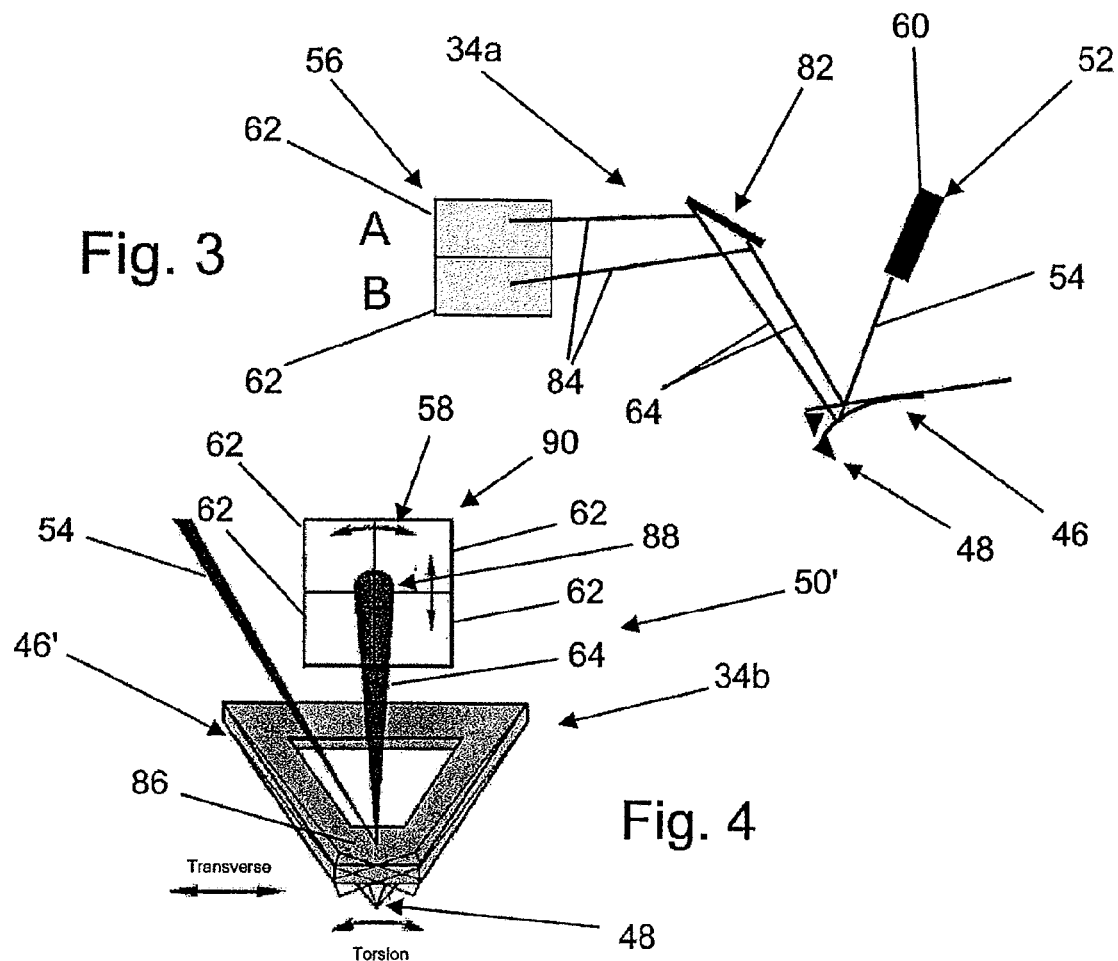
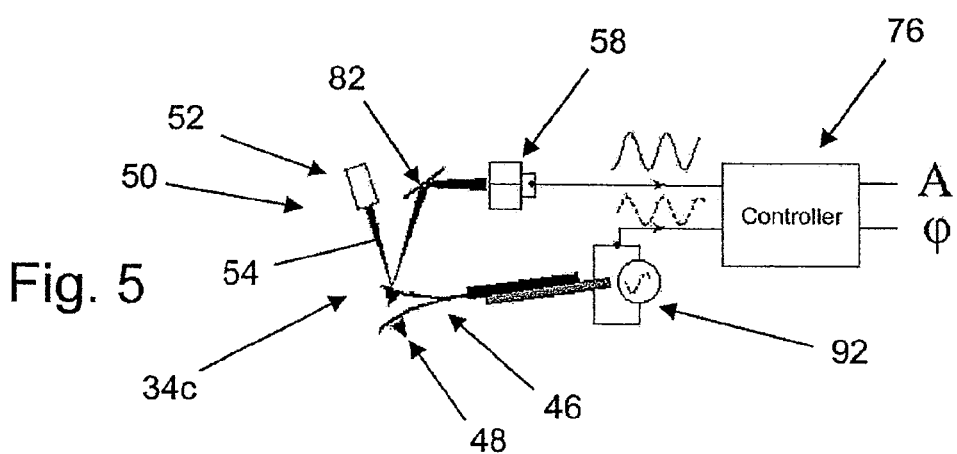

PROBE MICROSCOPE SETUP METHOD

CROSS REFERENCE TO RELATED APPLICATIONS

This application is a divisional application of U.S. application Ser. No. 11/203,506 filed Aug. 12, 2005, now U.S. Pat. No. 7,513,142, issued Apr. 7, 2009, the entirety of which is expressly incorporated by reference herein.

FIELD OF THE INVENTION

The present invention is directed to a method and arrangement for automating the setup of a probe microscope such as an atomic force microscope (AFM), and more particularly to a method and arrangement of automatically adjusting AFM parameters and in doing so being also capable of self-adjusting AFM operation.

BACKGROUND OF THE INVENTION

Probe-based instruments obtain information via interaction between its sensing element and a sample being analyzed. One such instrument that is typically used for nano-scale and even atomic-scale analysis is a type of scanning probe microscope (SPM) referred to as an atomic force microscope (AFM). It is very versatile because it can analyze conductive and non-conductive samples since the sample may not be electrically charged during operation.

The sensing element of an AFM is a probe that interacts with the sample during operation to obtain information about the sample, such as size, surface contour or topography, shape, roughness, atomic makeup, molecular makeup, and/or other characteristics. The cantilever often includes a probe tip, e.g., stylus, and is scanned over the sample by moving it and/or the sample relative to one another in a manner preferably in a raster scan pattern. The analysis produces data from tip-sample interaction at numerous locations of the scan, which often is used, for example, to generate a topographic image depicting the outer surface of the sample that was scanned. More generally an SPM measures any number of properties of a sample, including for example surface topography, magnetic forces, electric forces, temperature, thermal conductivity, electrical properties, friction, elasticity, adhesion, just to name a few. These and other data representative of sample properties are typically measured by using a probe and detection system that can convert a probe sample interaction into data that is indicative of the property of interest. For example, in the case of magnetic measurements, an AFM tip is coated with a magnetic material and the resulting force between a sample region and the AFM tip is detected.

The cantilever and tip (where so equipped) form a probe that is received in a mount, e.g., probe mount, of the AFM. An AFM probe has at least one cantilever that extends outwardly from a support typically referred to as a base, substrate or chip and that can be part of the mount. The cantilever typically is elongate, narrow and relatively small to achieve nano-scale and atomic-scale imaging. For most such applications, the cantilever usually is no longer than about 500 microns and no wider than about 50 microns, and typically much smaller. The tip is also quite small and usually quite sharp, typically having a radius or diameter between three and fifty nanometers.

During operation, the cantilever is scanned over the sample, typically in a raster pattern, to analyze the sample. As the cantilever moves along the sample surface, its tip can move up, such as when a bump on the sample is encountered, can move down, such as where there is a depression or sidewall in the sample, and, in certain instances, can move side-to-side, such as when friction is encountered or when CD imaging of semiconductor sidewalls is performed.

Relative movement between the sample and cantilever is controlled to help position the tip so it either contacts the sample or is close enough to the sample that interaction between the cantilever tip and sample occurs. This interaction can be caused by friction, such as tip-sample friction, molecular force, including strong and weak, e.g., van der Waals, molecular forces, as well as magnetic force, for example. This interaction is desired because it is measured during operation to analyze the sample, including when imaging the sample.

Controlling relative movement can be done in many ways but typically is achieved using one or more selectively controllable actuators. These actuators, typically of piezoelectric construction, are used to either move the cantilever relative to the sample, the sample relative to cantilever, and, in some instances, both of them at the same time. For example, in one well know arrangement, at least one actuator is used to move the cantilever, and hence its tip, toward or away from the sample along the Z-axis. One or more actuators are typically used to provide relative movement between the cantilever and sample along either or both the X-axis and the Y-axis. One well known positioning device used in AFMs employs one or more actuator that provides motion in up to three orthogonal dimensions, and is referred to as a scanner. Suitable examples of such high-resolution, three axis scanners are disclosed in Hansma et al. U.S. Pat. No. RE 34,489; Elings et al. U.S. Pat. No. 5,226,801; and Elings et al. U.S. Pat. No. 5,412,980. The scanner may be a single unit that provides motion in three directions or may be made from discrete units. As mentioned above, the relative scan motion can be created by scanning the probe, scanning the sample, or any combination thereof. For example, some AFMs are constructed to scan the sample in the XY direction and actuate the probe in the Z-direction.

As the sample is scanned during AFM operation, the cantilever deflects in response to interaction with the sample. A detector is used to measure this interaction, typically by measuring cantilever deflection. This is because changes in interaction force, such as due to a change in sample surface height or sample surface roughness, cause cantilever deflection to change in a corresponding, even proportional, manner. Therefore, measuring the changes in cantilever deflection that occur during scanning provide information from which various sample characteristics, including the contour of its out surface, can be obtained.

One commonly used detector uses the cantilever as an optical lever that reflects a beam impinging against it during scanning. Any change in cantilever deflection causes a corresponding change in the incident angle of the reflected beam, which is measured by measuring reflected beam movement using an optical sensor on which the reflected beam shines. One suitable and preferred optical sensor uses one or more photo-detector sensors or the like arranged in an array, such as in a side-by-side or even quadrature array, to sense any changes in reflected beam position. During scanning, output from the array is collected and processed so as to enable an image of the sample surface scanned by the cantilever to be produced in a manner where it can be displayed, printed, further analyzed, etc. An example of one such detector suitable for AFM use is disclosed in Hansma et al. U.S. Pat. No. RE 34,489, which uses a laser to produce the beam for the optical lever arrangement.

Since AFMs are often capable of operating in more than one mode, the nature of interaction between the cantilever and sample is usually, if not always, mode dependent. For example, a cantilever of an AFM operating in contact mode will encounter a different type and magnitude of interaction than when operating in a non-contact mode, e.g., oscillating mode. Where contact is direct, interaction obviously tends to be direct as forces are directly transmitted between the cantilever and sample. Where interaction is less direct, such as when it is indirect, e.g., non-contact mode, the nature of cantilever-sample interaction can prove relatively complex. For example, it is not unusual for interaction to be due to one or more of weak molecular force attraction, such due to Van der waals forces, stronger atomic-based forces, repulsive forces, and adhesive forces due to contact with a hydrophilic layer on top of the sample, which also can be dependent on the makeup of the sample as well as how close the cantilever tip is to the sample.

In contact mode operation, the probe is typically scanned across the surface of the sample while keeping the force of the tip of the probe against the surface of the sample generally constant. This is usually accomplished by moving either the sample or the probe vertically relative to the surface of the sample being analyzed in response to sensed deflection of the cantilever as the probe is scanned generally continuously across the surface of the sample. Vertical motion feedback information can be stored, along with other tip-sample interaction feedback information, and used in constructing an image or the like representative of the surface of the sample that corresponds to the sample characteristic being measured, e.g., surface topography.

Depending on the AFM, some AFMs can operate in different types of oscillation modes including where the oscillation frequency is tied to a resonant frequency of the cantilever. Feedback normally is used to keep a parameter of cantilever oscillation (e.g., amplitude, phase, frequency) constant. The information providing the feedback typically is at least partly based on cantilever-sample interaction, e.g., tip-sample interaction, taking place during operation. As is preferably also the case with contact mode operation, information obtained using cantilever-sample feedback is collectable, storable, and usable as data to analyze the sample, including by characterizing it as well as imaging it.

One particularly advantageous and versatile oscillating mode is TappingMode™ AFM (TappingMode™ is a trademark owned by Veeco Instruments Inc. of Santa Barbara, Calif.), which is implemented by oscillating the cantilever at a frequency at or near its resonant frequency. Cantilever oscillation amplitude, phase or frequency preferably is kept substantially constant via feedback, information for which is obtained from the cantilever-sample interaction, e.g., tip-sample interaction, that takes place during operation. In intermittent contact or TappingMode AFM the tip only periodically contacts the sample surface generally according to the drive signal, thus making it a lower force mode operation than a mode such as contact mode where the tip and sample are substantially continuously engaged.

No matter which operational mode is chosen, setup and operation of a measurement instrument as complex and versatile as an AFM can be time consuming and tricky, especially for a novice AFM operator. For example, setup and operating parameter values typically depend on factors such as the type of sample material including whether it is hard or soft, conductive or non-conductive, organic, synthetic or biological in nature, among other things.

While past attempts have been made with AFMs to automatically adjust gain to minimize the difference between trace and retrace data, this method also has not proven particularly effective. For example, it may not be able to handle sample topography and operating parameters, such as, setpoint, actuator hysteresis and tip shape, which can unpredictably and adversely impact trace-retrace differential data such that any attempt to control it through gain adjustment is largely ineffective.

This is not surprising in view of the numerous scan parameters that must be taken into account in AFM setup and operation along with those that can require adjustment during operation. For example, a user may need to adjust such scan control parameters as setpoint, scan speed, proportional gain, integral gain, drive frequency, drive amplitude and other parameters. Without great care, considerable experience, and sometimes a little luck, tip, cantilever or sample damage can occur, poor or unusable results can be obtained, and, in instances where everything appears to go well, operation inefficiencies can be so great that scanning time is nowhere near optimal thereby wasting a considerable amount of time, which is particularly problematic for high throughput applications such as those of the semiconductor industry.

For example, at present, if the value any one of several control parameters manually selected is not at or within a reasonable range of its optimum, poor performance and unacceptable data will very likely result. In addition, relatively complex interdependencies existing between certain AFM parameters often make setup a trial and error procedure, even for the most experienced AFM operators.

In performing AFM setup, the values for several control parameters must be set along with feedback loop gains for different operational modes and other instances where setting up such gains is required. Setup must take into account and configure for parameters such as scan size, pixels per line, number of scan lines, scan rate, tip scanning speed, digital-to-analog (D/A) resolution, Z-center position, i.e., Z-center voltage or the center of the Z piezo operation range, tip wear control, and sample damage minimization. When an AFM is set-up to operate in oscillatory mode, such as TappingMode™, setup must include choosing an amplitude and setpoint associated with the oscillation.

When an AFM is going to operate in an oscillatory mode, such as TappingMode™, initial values for integral gain, i.e., I-gain, and proportional gain, i.e., P-gain, may also be manually set. Selecting gain values can be tricky because it typically depends on factors such as the nature of the oscillatory mode being employed, sample topography, the type of sample and medium in which it is located, as well as other factors. For example, where gain is set too low, system response tends to be relatively slow, which can result in the tip not following the sample surface. Where set too high, the feedback loop can start oscillating or backfeeding upon itself, which can undesirably add considerable noise to the sample image being generated.

In addition, the initial gain setup may be fine initially, only to be unsuitable later, such as when topography changes. For instance, where the sample is relatively rough, gain typically should be set higher in order to image such high featured topography with any resulting increase in feedback oscillation noise being tolerable. Where the sample is relatively smooth or flat, gain should be set lower to minimize noise. By keeping noise low by keeping gain low, better resolution of flat areas is achieved thereby enabling the AFM to better image its finer details. However, as understood in the field, excessive noise can adversely affect imaging along flatter areas of the sample where an initially high gain setting ends up being too high when the sample flattens out. Conversely, an initial low gain setting frequently impedes imaging of higher features of the sample producing an image with such higher features being either distorted or missing.

These setup considerations become even more problematic when operating in an oscillating mode, such as Tapping- Mode™. For example, since the highest useable gains when operating in TappingMode™ typically depend on cantilever dynamics, setting gains becomes further complicated because cantilever dynamics, in turn, is a function of the free air tapping setpoint. Indeed, factors such as cantilever dynamics and Z-actuator response speed can create such difficulty in setting the initial setpoint and gains, the operator often resorts to trial and error until the sample image starts to look good.

Unfortunately, because one can affect the other, trial and error can go on for a long time. For example, as setpoint is lowered, gain can be set higher and vice versa. However, while lower gains permit a lower setpoint to be used, which typically increases cantilever response, it also increases error generation rate, which can undesirably blur or otherwise distort the image being produced during scanning.

In the end, what often results is the operator setting some initial parameter values, gains and setpoint, and then manually adjusting the value of each, one-by-one until feedback oscillation occurs and then backs off. While this process may work reasonably well for experienced AFM operators, it is inefficient, time consuming, and quite often, less than optimal. In addition, it does nothing to address the dynamic nature of AFM imaging, which often requires an operator to either change certain settings on the fly during operation or to observe the image, etc., and go back and re-scan those parts of the sample that are poorly imaged with adjusted parameter values. Once again, extremely slow, inefficient and non-optimal.

Expert user intervention is typically also required during pre-scan or image acquisition processes to maintain probe-sample interaction according to the mode of operation. The above-described scanning probe microscopes (SPM) employ a uniaxial feedback control system to maintain probe-sample interaction while scanning. That is, such a system is capable of actuating to alter probe-sample distance along the Z-axis, and also of sensing probe response to sample surface position along the Z-axis. Moreover, SPM engage establishes initial probe-sample interaction, whether continuous or intermittent. Successful maintenance of a continuous (contact mode) or intermittent (TappingMode™) target interaction while scanning in a direction other than Z demonstrates good tracking of the sample surface by the probe.

Such tracking fails when the probe ceases to interact with the sample. This is more apt to happen under any of the following conditions including, but not limited to, (1) in the scan direction, the sample surface slopes away from the probe; (2) the SPM is scanning rapidly; (3) the feedback loop gain is set low; and (4) at the chose setpoint, probe-sample interaction is weak. In one known tracking measurement technique, a trace-minus-retrace (TMR) operation may be performed. Wherein the same N (e.g., 512) consecutive data acquisitions on the sample surface measured scanning in one direction, are individually subtracted from samples taken from obstensibly the same sites in reverse order during retrace of the same sample surface line. Problems have been demonstrated with this technique and thus an improvement has been desired in the AFM field.

Hence the need has arisen for a method and arrangement that is able to automate AFM setup, and do so to achieve optimal tracking between the tip and sample. What is further needed is the same or a like method capable of being used during actual AFM scanning.

SUMMARY OF THE INVENTION

The preferred embodiments are directed to a probe type microscope measurement instrument and method of operation for monitoring and assessing proper tracking between the tip and sample, as well as automating at least some aspects of AFM setup previously done manually and performing a pre-scan that facilitates determining a value of one or more optimum measurement instrument operating parameters under the requirement that the tip wear and sample damage are minimized during the optimizing process. Tracking analysis can be carried out using pre-scan or normal operation scan data to determine whether tracking is acceptable or not. Tracking qualification can then be used to select or otherwise adjust a value of at least one measurement instrument operating parameter so as to improve tracking and otherwise optimize setup.

The measurement instrument includes a probe that includes a cantilever that can have a tip which interacts with a sample during operation in a manner from which data is obtained that can be used to analyze the sample. One such preferred measurement instrument well suited for the present invention is a scanning probe microscope, such as a scanning tunneling microscope or scanning force microscope.

One particularly preferred measurement instrument is a scanning force microscope also known as an atomic force microscope (AFM). Such an AFM preferably includes a probe with at least one cantilever that can be equipped with a tip at or adjacent its free end, a probe mount or holder, an arrangement, such as a scanner, that enables relative positioning of the probe and sample, a detector that is linked to or which otherwise cooperates with the probe to obtain cantilever-sample interaction related data during operation, and a controller that can also process the cantilever-sample interaction related data, if desired. For example, where the measurement is an AFM, the detector can be of an optical lever configuration, such as is commonly used in the art. However, where the measurement instrument is, for example, an STM, the detector preferably is configured to measure or otherwise sense electrical activity associated with interaction with the sample during operation.

In the practice of a method in accordance with the present invention, a processor is linked to the measurement instrument in a manner that enables it to facilitate carrying out one or more of measurement instrument setup, monitoring, control, and operation. In one preferred embodiment, the processor is disposed onboard the controller, e.g., the controller processor, and can be a microcontroller, microprocessor, field-programmable gate array, etc. or some combination of one or more thereof. In another preferred embodiment, the processor can be made up of like components or possess a similar architecture but be located offboard the controller and linked to the measurement instrument. Indeed, the present invention contemplates different processors being responsible for implementing or otherwise carrying out different steps, elements, or aspects of the method of the present invention.

The method of the invention is directed to automated measurement instrument setup, automated measurement instrument tuning or optimization, employing a pre-scan to facilitate tuning or optimization, as well as performing tracking quality determination. It will also automatically display error messages and warnings if it detects failures. It should be noted that each of these can be implemented alone, in combination with one or more than one, or altogether, including during actual measurement instrument operation if desired. The ability to separate, combine, aggregate these things advantageously results in a flexible, highly configurable and measurement instrument adaptable method capable of numerous different implementations. This should be kept in mind with regard to the following summary and detailed description of the invention as the disclosure that follows many times groups or links things together for the sake of convenience or clarity when that need not always be so linked or grouped.

In one preferred implementation of the method, reduced manual operator setup limits data entry significantly from that previous. For example, depending on the instrument, its operating configuration, operational modes and, perhaps other factors, manual data entry can be limited to scan size, e.g. pre-scan size, operational mode, where applicable, and scan force or speed, once again where applicable and the estimated time to finish the operation. It should be noted that in the case where even these parameters can be addressed in an automated fashion, the present invention contemplates in such a case the operator simply pressing a single button, whether physical or on a computer display. Where such "one touch" operation is possible, instrument setup, including any operating parameter determination and tuning, is completely automated preferably both prior to and during actual operation.

After any manual data entry is completed, an automatic tuning procedure can be performed, such as where it is desired to operate the instrument in a desired mode requiring such tuning. For example, where the measurement instrument is an AFM, automatic tuning can be done where the AFM is going to be operated in an oscillatory mode, such as Tapping-Mode™. In one preferred implementation, automatic tuning is carried out to determine a resonant or natural frequency of the measurement instrument cantilever, as well as the drive signal information such as drive frequency, amplitude and drive phase, taking into account any relevant factors that might affect such determination during actual operation.

During or after any automatic tuning carried out, obtaining, selecting and determination of values of at least a plurality and preferably a plurality of pairs of operating parameters are obtained, determined or otherwise selected. Where determined, the setting can be calculated, where obtained, the setting can be looked up, such as from a data storage location, including that which is part of a lookup table, and where selected, the setting chosen can be based on a comparison, relativity, or the like.

During or after this procedure, the value of one or more operating parameters can be tuned or optimized. For example, in one preferred implementation, automatic gain optimization is performed to set integral gain (I-gain) and proportional gain (P-gain) to an optimum value. Such optimization can be based on one or more of noise, amplitude, step response of the system or tracking quality and can be based on all of these if desired. The automatic gain optimization is performed at zero scan size that greatly assures the minimized damage on the tip and sample.

A pre-scan can be carried out in addition to or as part of tuning and optimization. In one preferred implementation, a pre-scan of the sample is done to optimize at least a plurality of gain, setpoint value, Z-limit (dynamic range of the Z-piezo), amplitude, e.g. free air tapping amplitude, scan size, scan rate, number of scan lines, number of pixels scanned per line, digital-to-analog resolution, Z-center position, etc. In one preferred implementation all of these are tuned or optimized during the pre-scan.

In a preferred pre-scan implementation, a tracking metric indicative of tracking quality is carried out to determine whether tracking is acceptable. Where unacceptable, the value of one or more operating parameters, such as scan speed or rate, setpoint, drive frequency, drive amplitude and/or gain is adjusted to see if tracking quality improves. If not, additional adjustment is performed until selection is made of the operating parameter value at which tracking quality in that particular instance is highest based on the tracking metric. In rare circumstances, after the self-optimization has done its best and the tracking quality is still poor, an error message will be displayed to the user to indicate the untruthfulness of the output data.

The above-mentioned procedures have been successfully implemented with Veeco's Multimode® and Dimension® 3100 AFM microscopes. They have been tested with Tapping Mode in air on various kinds of samples including height standards, CD stampers, Si wafers, and some polymer samples with a successful rate higher than 95%.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

FIG. 3 is a schematic diagram of conventional optical deflection monitoring system of an AFM;

FIG. 4 is a schematic diagram illustrating a probe of an AFM being oscillated in torsion;

FIG. 5 is a schematic diagram of an alternate AFM setup;

DETAILED DESCRIPTION OF AT LEAST ONE PREFERRED EMBODIMENT

Figure 1:
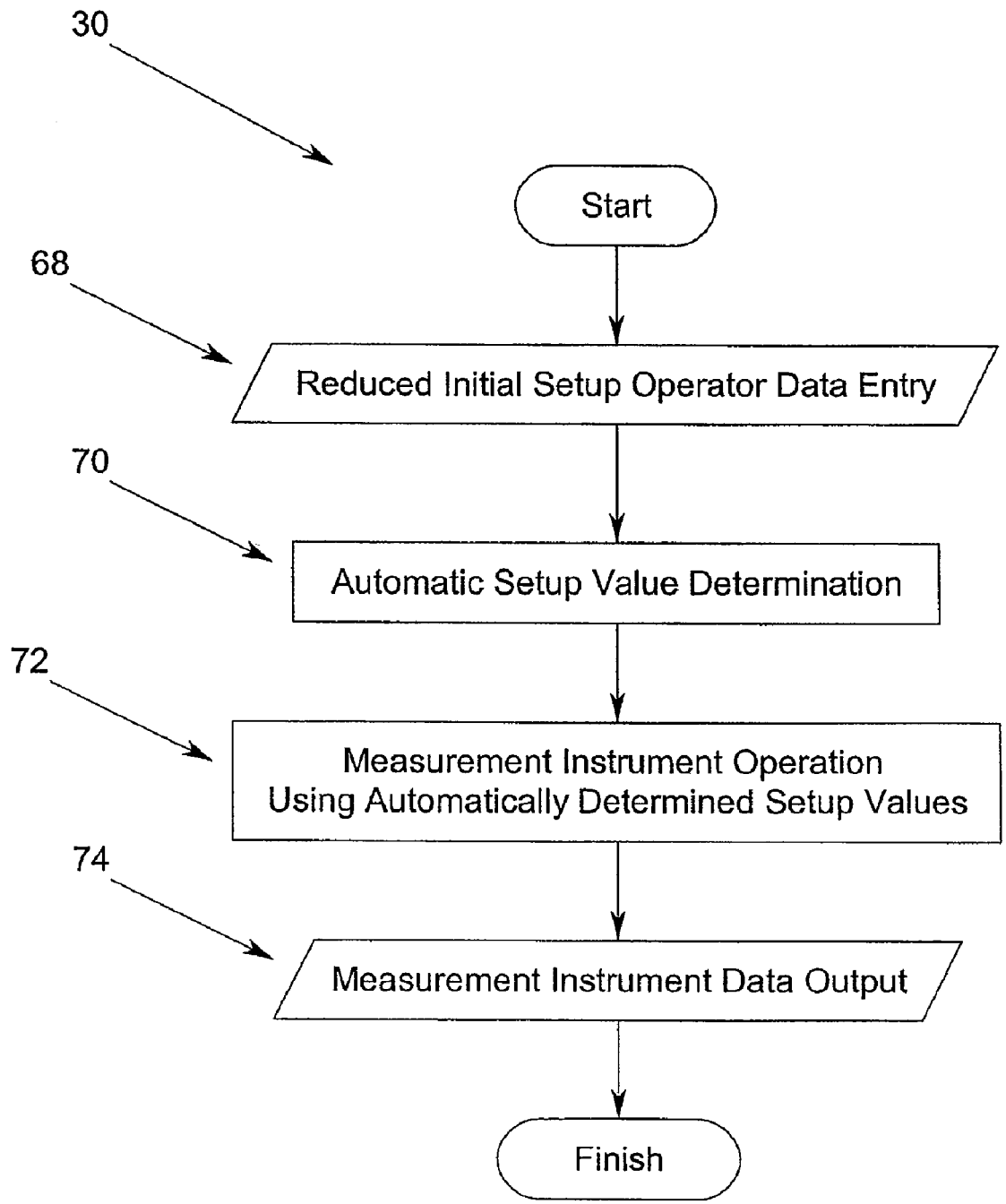
FIG. 1 is a flow chart illustrating a general method of automating SPM setup according to the preferred embodiment.
Figure 2:
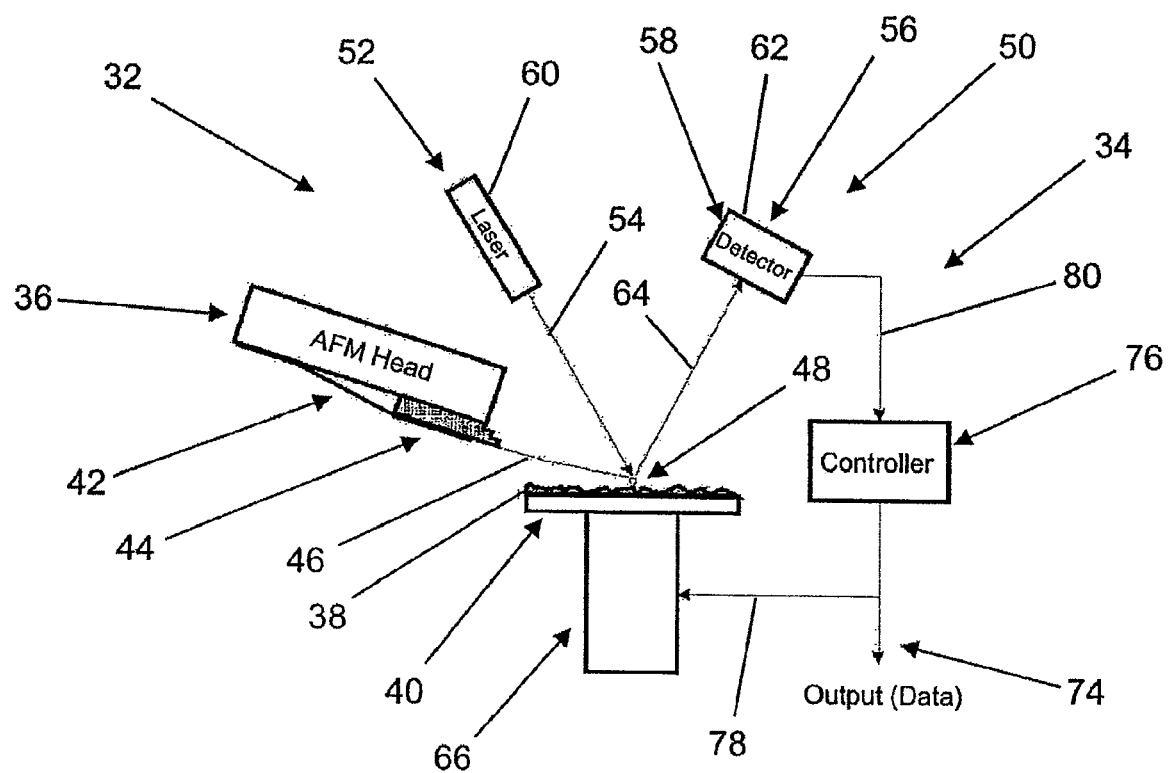
FIG. 2 is a schematic diagram of a conventional AFM.

FIG. 1 presents a flowchart 30 illustrating a preferred method of the invention used to automate operation, particularly setup, of a probe type measurement instrument 32 employing, for example, a scanning stylus or tip, depicted schematically in FIG. 2. The measurement instrument method of the invention advantageously simplifies measurement instrument setup by reducing the number of setup parameters a user must estimate and manually input before using the measurement instrument. For example, the method of the invention beneficially eliminates virtually all of the trial and error typical of the past when setting up a scanning probe type measurement instrument.

With continued reference to FIG. 2, one type of probe type measurement instrument 32 for which the method of the invention is particularly well suited is a type of Scanning Probe Microscope (SPM) called an Atomic Force Microscope (AFM) 34. The AFM 34 has a head 36 that preferably is movable in at least one direction or axis relative to a sample 38 disposed in a cell, e.g., a fluid cell or on a sample holder 40. The head 36 includes a probe mount 42 that releasably accepts a probe 44 including a cantilever 46 that typically is also equipped with a tip 48 (i.e., stylus) at or adjacent its free end. To obtain measurement data during AFM operation when analyzing the sample 38, deflection of the cantilever 46 interacting with the sample 38 is detected using a deflection monitoring system 50. A controller 76 preferably uses deflection information as feedback to determine whether to change or adjust the relative position between the tip 48 and sample 38 such as by moving one relative to the other.

FIG. 2 illustrates an optical-type deflection monitoring system 50 which includes a beam emitter 52 that outputs a beam 54 that reflects off the cantilever 46 against a sensor arrangement 56 that preferably includes at least one beam detector 58. The beam emitter 52 typically is a laser 60, such as a diode laser, and the beam detector 58 typically is a photo detector 62, preferably a photodiode. Often times, a plurality of photo detectors 62, usually four, is used to enable precise measurement of the location of the reflected component 64 of the laser beam 54 on the beam detector 58 in measuring deflection of the cantilever 46.

Deflection measurement data 80 is provided to the controller 76, which preferably processes it before outputting it as output data 74, typically by processing the deflection measurement data 80 as feedback to determine a drive signal 78 based on an oscillation setpoint (e.g., amplitude, phase or frequency) used to adjust the relative position between the tip 48 and sample 38. For example, as is shown in FIG. 2, feedback from deflection data 80 is used to generate at least one drive signal 78 that drives at least one actuator, such as a piezoelectric actuator, to change relative tip 48 sample 38 position. While the particular AFM embodiment shown in FIG. 2 feeds the drive signal 78 to a scanner actuator assembly 66 underlying the sample 38 to move the sample 38 relative to the tip 48, it is contemplated that the AFM 34 can be configured to provide the drive signal 78, or an additional drive signal (not shown), to drive a scanner actuator assembly (not shown) of the head 36 such as to move the tip 48 relative to the sample 38. Moreover, processing of the acquired deflection signals can be implemented in analog with an RMS-to-DC converter, a comparator and a gain stage (PI, for example), or even more preferably, the processing can be performed entirely digitally, including the gain stages.

In preparation for AFM 34 setup and use, a probe 44 is installed on the AFM head 36, a sample 38 is placed in its holder 40, the cantilever 46 is aligned relative to the laser 60, and the photodiodes 62 of the beam detector 58 are also aligned. In practicing the measurement instrument setup method 30 of the invention illustrated in FIG. 1, an AFM operator (not shown) enters a reduced set of initial setup data 68 as compared to what was previously done following conventional setup procedures. This advantageous aspect of the method of the invention alone significantly speeds setup, for example, because no more than about 15% of the setup data is manually entered as compared to before. Once initial manual data entry 68 is completed, automatic setup value determination 70 is initiated to determine the rest of the setup values, at least some of which previously needed to be entered manually. These automatically determined setup values are then used during AFM operation 72 to analyze the sample 38 from which output data 74 is obtained.

If desired, the output data 74 can be further analyzed, manipulated, processed, etc. However, as is normally the case, the output data 74 can also be used to make an image of the sample 38. For example, depending on its format, etc., the output data 74 can be outputted as an image or in an image format. Such an image can be displayed, such as on a monitor or the like, or printed out. The output data can also be stored, including in an image format or the like, such as for subsequent reference, comparison, additional processing, analysis, etc.

While the method of the invention is particularly well suited for automating setup of an AFM 34, it is also well suited for automating setup of other types of probe type measurements. For example, in one method implementation, the method discussed above in conjunction with FIGS. 1 and 2, as well as those method implementations discussed herein below, can be adapted for use in automating setup of another type of SPM, namely a Scanning Tunneling Microscope (STM).

This also holds true for other types of scanning stylus or probe type measurements as well as for their different modes of operation. For example, FIG. 3 illustrates an AFM 34a suitable for use with the method of the invention that is configured for operation, for example, in a non-contact, non-oscillatory mode such that interaction between the tip 48 of the cantilever 46 and the sample (not shown in FIG. 3) is indirect and typically either attracts or repels. The AFM 34a differs from that shown in FIG. 2 in that the reflected beam component 64 is, in turn, reflected off of an optical element 82, e.g. a mirror or the like, before the second reflected component 84 irradiates one of a plurality of side-by-side photo detectors 62 labeled A and B.

FIG. 4 illustrates another suitable AFM 34b operating in an oscillating mode known as torsional deflection mode with, for example, the tip 48 of the torsional cantilever 46' being scanned along the sample (not shown) in a transverse direction as shown. Its deflection monitoring system 50' directs a beam 54, such as a laser beam, that reflects off the top surface 86 of the cantilever 46' adjacent its free end, preferably generally overlying the tip 48 as the probe is driven to oscillate in torsion. As the cantilever is scanned in a sideways direction along the sample (not shown) changes in the torsional oscillation of the cantilever 46', i.e. torsional deflection, causes the reflected beam component 64 to change the location of the spot 88 where it impinges against at least one of four photo detectors 62 arranged in the four quadrant beam detector array 90 depicted in FIG. 4. In one embodiment, Z-direction cantilever deflection, i.e., deflection toward or away from the sample, can also be measured.

FIG. 5 depicts still another AFM 34c that is well suited for automated setup employing a method in accordance with the present invention. The cantilever 46 of the AFM 34c is driven in an oscillatory mode, such as TappingMode™, where amplitude, A, phase, ϕ, and possibly frequency, of the cantilever 46 are monitored and analyzed, such as by AFM controller 76. During operation, for instance, phase related feedback from the cantilever can be used along with cantilever deflection feedback from the deflection monitoring system can be used to adjust or otherwise regulate driving of the cantilever in a desired manner. For example, such feedback can be used to adjust the amplitude, phase, frequency, etc. of a drive 92 used to oscillate the cantilever 46 during operation.

Overall, the method of the present invention provides significant advantages over conventional manual setup procedures used in the past for these and other types of measuring instruments. Not only does the method of the present invention significantly speed up setup, it also provides more consistent measurement instrument results, increases measurement instrument uptime, reduces cantilever and tip damage during setup, all while making it easier for veteran and novice users alike to setup and quickly, consistently and repeatably use the measurement instrument no matter what the application, sample type, instrument type, mode of operation, cantilever configuration, etc.

Figure 6:
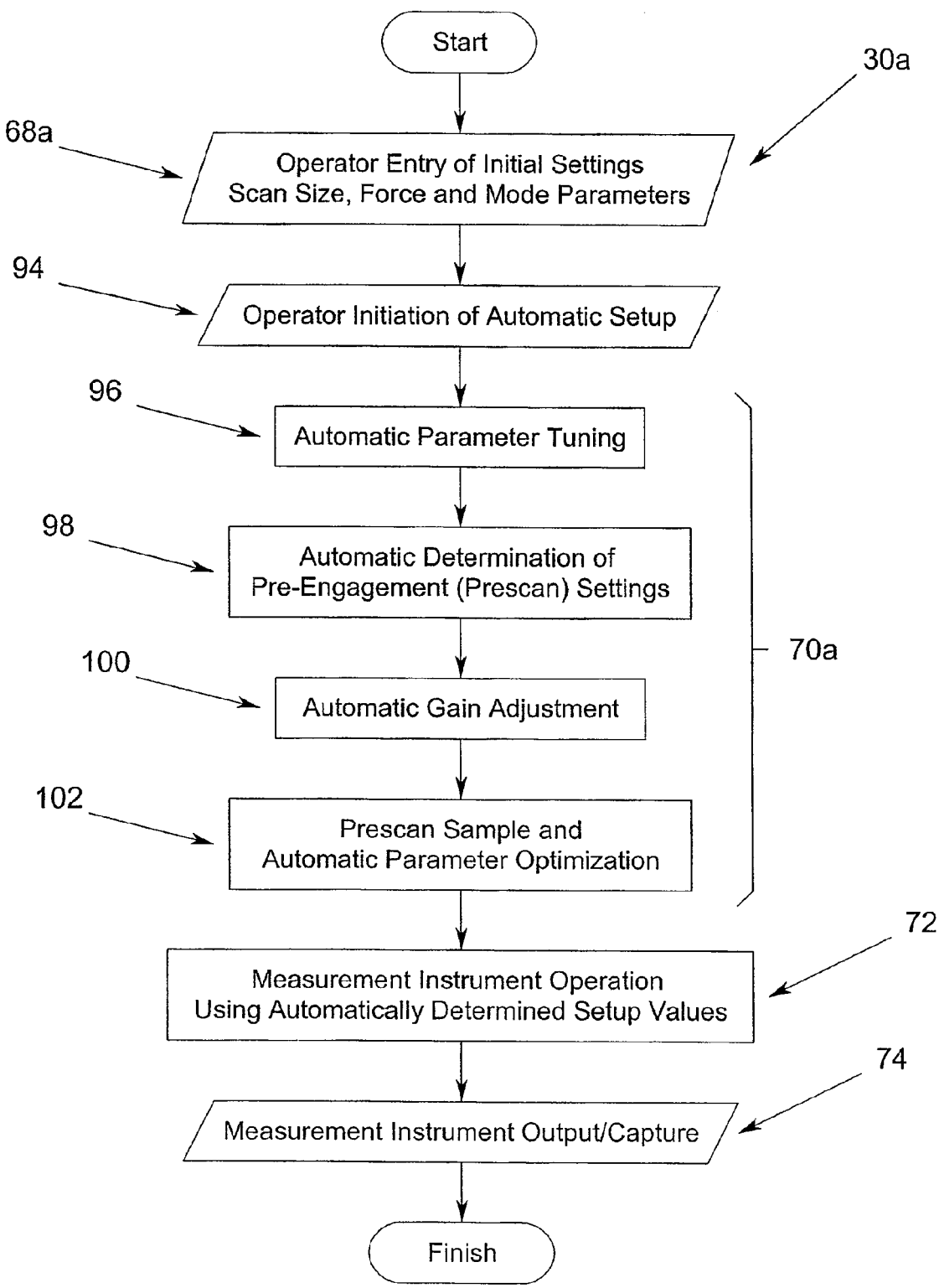
FIG. 6 is a flow chart illustrating an alternate automating SPM setup method according to the preferred embodiments.

FIG. 6 illustrates a currently preferred measurement instrument setup method implementation 30a that includes additional method steps 96-102 that further define the automatic setup value determination step 70 of the method shown in FIG. 1. These steps, also collectively grouped under reference numeral 70a, include an automatic parameter tuning step 96, a pre-scan setting determination step 98, an automatic gain adjustment step 100, and a pre-scan step 102, which also preferably is configurable in a manner that helps further optimize at least some of the setup parameters.

While these steps can be implemented in the method as needed, preferably all are employed in the currently preferred method implementation shown in FIG. 6. As a result, virtually all, if not every single one, of the initial measurement instrument operating parameter settings needed to begin operation are not only automatically determined before operation begins but preferably also optimized, to at least some degree, along the way so as to help improve operational speed, increase scanning efficiency, maximize scan quality and resolution, minimize tip and/or sample damage, all while increasing repeatability. In addition, as discussed in more detail below, at least a plurality of these steps can also be implemented in at least an as-needed basis during measurement instrument operation to dynamically self-optimize operation by continuing to adjust the value or values of one or more measurement instrument operating parameters.

Figure 7:
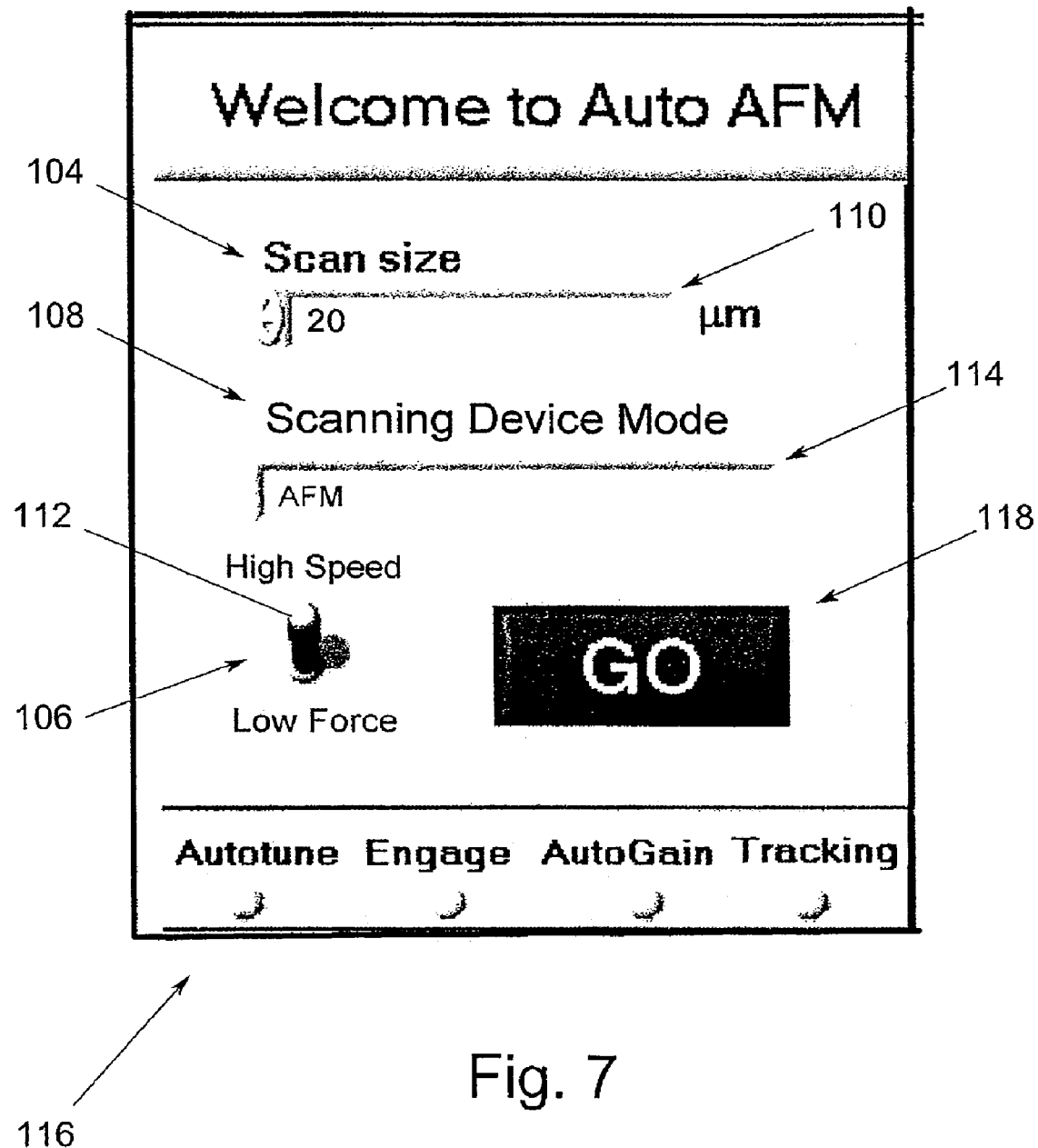
FIG. 7 is a user display interface according to the preferred embodiments.

Referring additionally to FIG. 7, in carrying out the method implementation depicted in FIG. 6, an operator provides initial settings for at least one of scan size 104, scan force versus high speed 106 (depending on, for example, the type of sample), and/or measurement instrument operation mode 108. For example, FIG. 7 depicts a preferred but exemplary data entry screen or window 116, ideally implemented in software and visually displayed to the operator, such as on-screen on a computer monitor. Alternatively, another switch of any kind of form, toggle or slide bar, can be added to control the image quality/resolution (the number of scan lines in each image) vs. imaging speed. The more scan lines in one image, the longer time it takes to finish. Alternatively, another display window can be added to inform the users of maximum imaging time required when they change the settings of the switches.

The initial settings data entry screen 116 is configured to allow the operator to manually input an initial value preferably for no more than three setup parameters. In the preferred data entry screen configuration depicted in FIG. 3, a Scan size numerical value 104, preferably in μm, is manually entered in an on-screen text box 110 if no values are entered by the user, a default value, for example, 1 μm will be used, a choice is presented to select between a High Speed and a Low Force probe scanning parameter 106 selected by manipulating the position of an on-screen toggle switch 112, an alternative way is to use a slide bar control so that the user can have more choices on Speed and Force combinations, and, depending on the capabilities, e.g., modes, of the measurement instrument, a Scanning Device Mode 108 also is manually selected, such as via a drop down selection menu 114.

Of course, other ways, arrangements, configurations, etc., can be utilized to facilitate entry of such initial parameter data. For example, combo-boxes, check boxes, radio buttons, drop down menus, or the like can be used, where suitable, to facilitate data entry for any of these initial setup parameters.

Where the measurement instrument has only a single mode of operation or has multiple but sufficiently similar operating modes, e.g., such as is the case for an STM, the Scanning Device Mode 108 may not be needed. Where this is indeed the case, Scanning Device Mode 108 can either be disabled or eliminated. Additionally, in the case where sample size is fixed or an effective scan size is established, it also may not be necessary to manually input Scan size 104 each time.

After initial setup is completed, the operator initiates automatic setup 94 by pressing the "GO" button 118, preferably using a selection device, such as a mouse or a computer keyboard. Thus, with just one touch of a single button, measurement instrument parameter setup preferably along with setup optimization is initiated, making operation both simple and fast. Alternatively, an "Abort" or "Stop" button can be added to cancel the operation at any time.

Figure 8:
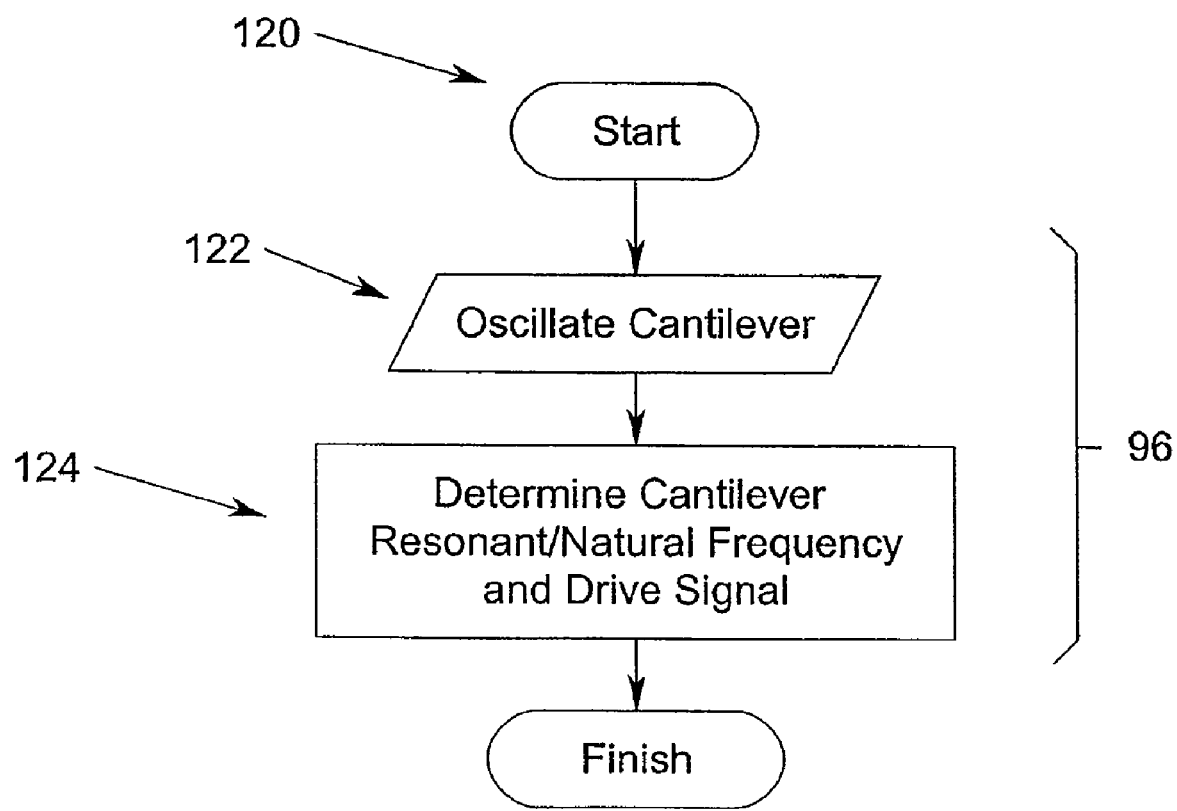
FIG. 8 is a flow chart illustrating a method of determining the natural resonance frequency of a probe according to the preferred embodiments.

Referring additionally to the flowchart 120 shown in FIG. 8, the automatic tuning step 96 is carried out to determine an operational frequency of the probe, as well as the drive signal (frequency, amplitude and phase). In a preferred implementation of this method step, automatic tuning 96 is carried out to determine a cantilever resonant frequency 124 such as, for example, the natural frequency of the cantilever. However, it should also be recognized that this method step may not always be required. For example, it may not be needed for certain types of measurement instruments and for certain operational modes. For example, with regard to AFMs, the automatic tuning step 96 may only be needed when operating in an oscillatory mode, including in particular, TappingMode™. In the currently preferred implementation of this method, the automatic tuning step 96 is performed for setting up an AFM that is going to operate in TappingMode™ where the tip of a cantilever being oscillated at or near a resonant frequency is going to intermittently interact with the sample.

In one preferred implementation of this method step, the cantilever is freely excited into oscillation 122 and the damping of its oscillations after ceasing excitation can be measured or analyzed to determine resonant frequency or a harmonic thereof 124. When operating in TappingMode™, for example, the cantilever of the measurement instrument is oscillated at frequencies near the resonant frequency until the resonant frequency is determined. This typically can be done in free air and in liquid, depending on the intended application. If desired, cantilever Q can also be determined in determining resonant frequency and can also play a role in resonant frequency determination, as well as impact the speeds at which the AFM is capable of operating. If available, another way of determining or measuring resonant frequency can also be used in carrying out this method step.

Figure 9:
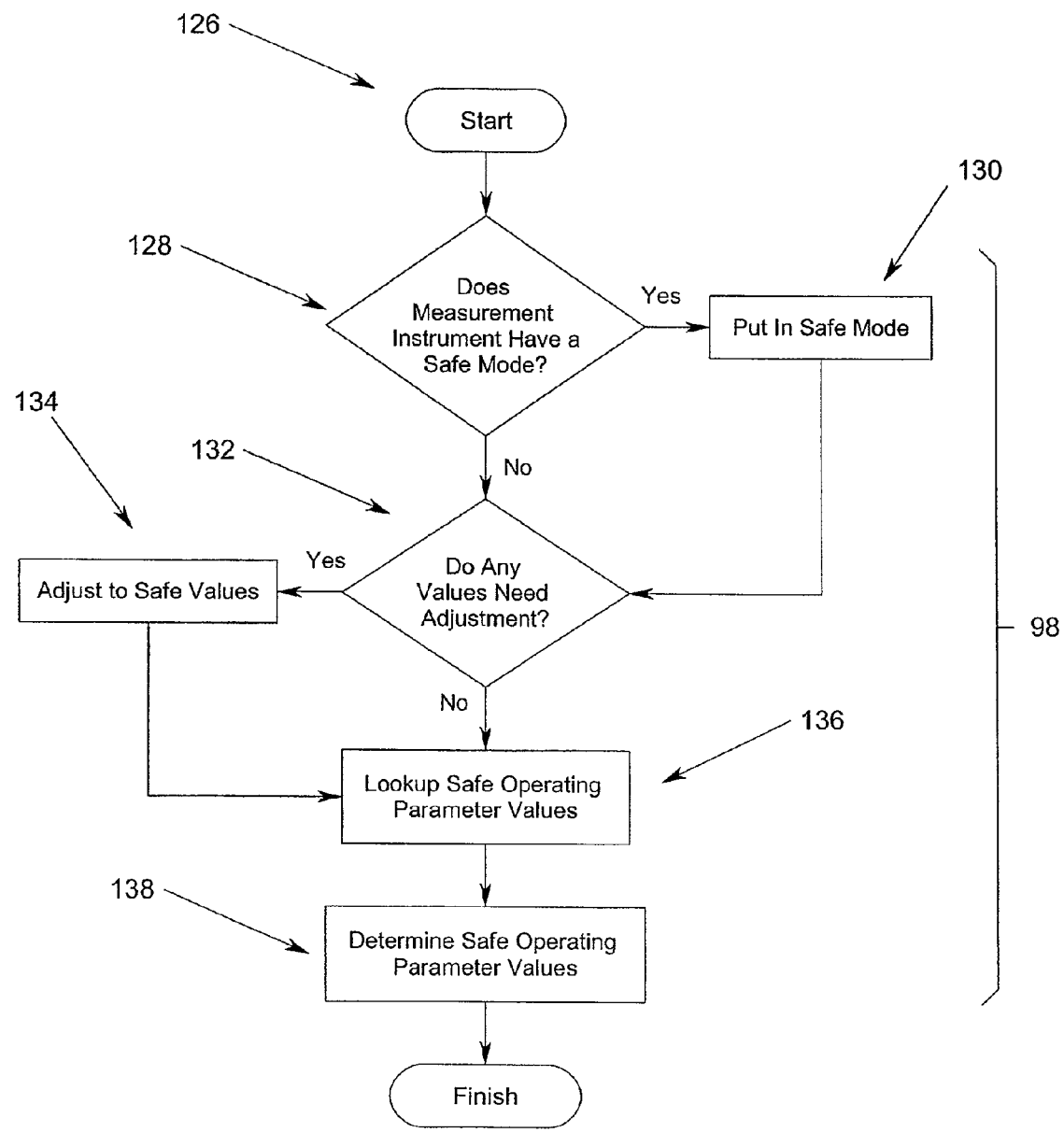
FIG. 9 is a flow chart illustrating a method of placing the AFM in a Safe Mode, according to the preferred embodiments.

Referring additionally to the flowchart 126 shown in FIG. 9, regardless whether an automatic tuning step 96 is employed, automatic determination of at least one value for at least a plurality of pairs of parameters is carried out in the pre-engagement determination settings method step 98. This step 98 involves obtaining or otherwise determining at least one "safe" value for a plurality of parameters required for pre-scan operation such that the value used as the initial setting reduces and preferably minimizes the likelihood of tip and sample damage during the pre-scan. This need not be done for parameters already optimized for pre-scan and for parameters which already are set at a suitably safe value. If desired, checking can be performed on one or more already determined values to check to see if their value is safe and to adjust it to a safe value if not.

A check 128 preferably is performed to determine whether the measurement instrument came pre-equipped with a safe mode feature previously intended to help minimize tip and sample damage during manual operator setup. Where so equipped, the instrument preferably is then put in safe mode 130. Where the safe mode sets certain parameters to suitably safe values, the present pre-engagement settings step 98 contemplates being at least configurable so as to be able to use or otherwise take advantage of the values parameters are set to in safe mode. In one preferred embodiment, the pre-engagement settings step 98 utilizes the benefits of such a safe mode already built into the measurement instrument by automatically switching it to the safe mode and utilizing any corresponding safe mode values operating parameters are set to as a result.

If desired, a check 132 can be performed do determine whether any of the safe mode parameter values, as well as for any previously determined parameter value, is suitably safe for use as an initial pre-scan value or whether the parameter value needs adjustment. To the extent needed, those parameter values in need of adjustment are adjusted 134 to a suitably safe value.

In carrying out pre-engagement settings determination, at least some pre-engagement settings preferably are selected or otherwise obtained 136 from a storage location, such as computer memory, flash memory, etc., where they have been pre-stored. Such settings can be part of a lookup table, e.g., a data table, (not shown) which is accessed in carrying out this method step 136.

If desired and to the extent necessary, values for other parameter settings can also be determined 138, including by calculation, such as where the value of the setting is dependent on some other factor. For example, where it is desired to constrain the values of two parameters to a desired ratio, selection of the value of one parameter automatically determines the value of the other parameter such that they are in accordance with the desired ratio.

Referring to FIGS. 6 and 9, in one preferred implementation, initial pre-engagement (pre-scan) safe values are set for between ten and twenty measurement instrument operating parameters. For example, in one currently preferred implementation, values for between fourteen and sixteen, typically about fifteen, such parameters are set. These include setting an initial safe value for at least the following parameters: (a) integral (I) gain, (b) proportional (P) gain, (c) amplitude noise (N), i.e., a noise threshold value, (d) a "back off" percentage, (e) fixed scan size, (f) scan rate, (g) number of scan lines, (h) bi-directional pre-scan I- and P-gain settings, $I_b$ and $P_b$, (i) offset voltage, and (j) Z-limit. The safe value need not necessarily be fixed. Rather, it can be a value falling within a safe range of suitable limits between which it is known to be safe. The value of a particular parameter can also depend on the value of some other parameter, even if it also must fall within a safe range of suitable values.

In one preferred implementation, each value is within ±15% of nominal. In another preferred implementation, each value is set right in the middle, i.e., midpoint, of its outer extents or limits or within 10% of its midpoint. Depending on whether the operator selects a high speed or a low force pre-scan force setting 106 (FIG. 7), the safe value can deviate in one direction or the other by as much as, for example, 20% from this safe value. For example, where high speed pre-scan is chosen, the safe value for one or more parameters may increase or decrease from the low force safe value by as much as 20% for a particular parameter. In contrast, where low force pre-scan is chosen the converse can be true and preferably, is true for at least one parameter in at least one preferred method implementation. Thus, a method according to the present invention preferably is configurable to select safe values for at least a plurality of parameters that differ depending on whether low force pre-scan or high speed pre-scan is chosen.

Figure 10:
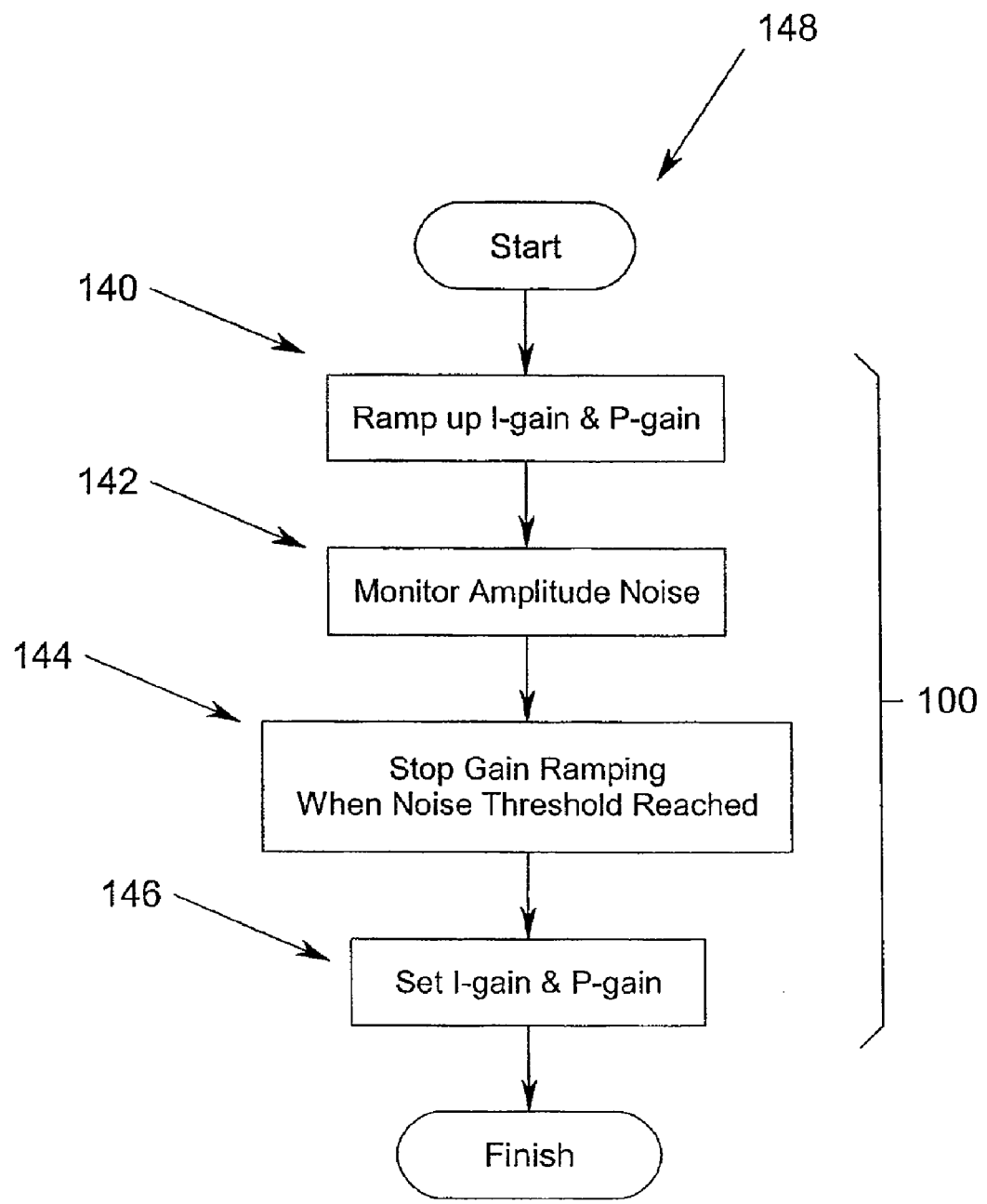
FIG. 10 is a flow chart illustrating a method of automatically adjusting gain according to the preferred embodiments.

FIG. 10 illustrates a flowchart 148 of a preferred implementation of an automatic gain adjustment method step 100 where the I-gain and P-gain are both ramped up 140 while amplitude noise is monitored 142 at a zero scan size setting. When amplitude noise reaches a certain value or threshold, gain ramping is stopped 144 and I-gain and P-gain are both set at a value based on the noise value when gain ramping stopped 146. In a currently preferred implementation, gain ramping is stopped 146 when the amplitude noise approaches, e.g., is within 5%, or reaches the onset of feedback loop oscillation. Feedback loop oscillation onset is detected when the amplitude noise reaches 200% of the normal level under certain parameter settings. For example, in one preferred implementation, I-gain and P-gain are both ramped up by increasing each one of their values until a noise threshold is reached. At that point, the value of the I-gain and P-gain are each set at their respective value when the threshold is reached. Thereafter, the I-gain and P-gain values at the time the threshold is reached are then backed off, such as by reducing them, for example, at least 3% and preferably no more than 15%, from their respective value at the time the noise threshold was reached.

Figure 11:
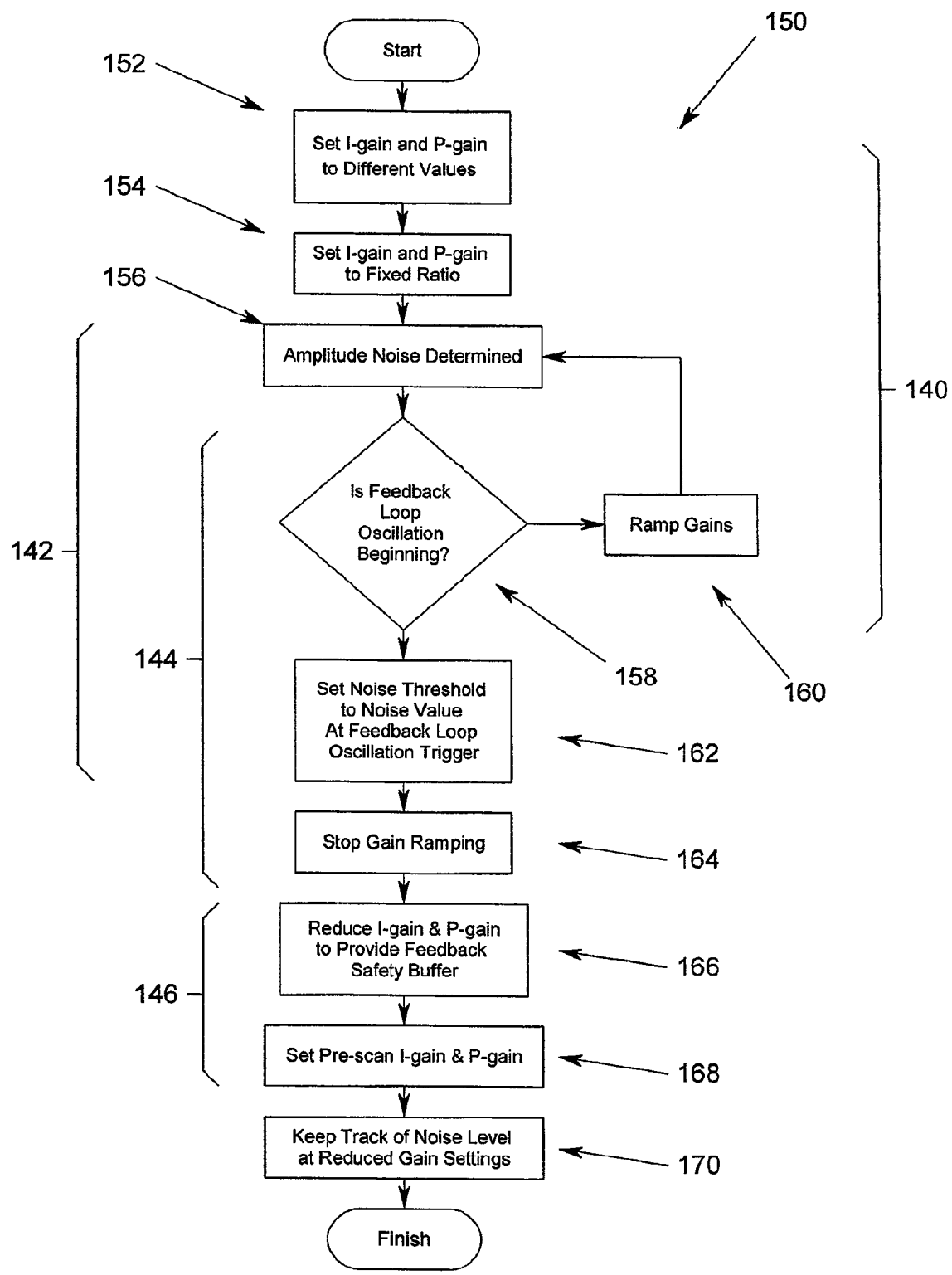
FIG. 11 is a flow chart illustrating an alternate method of automatically adjusting gain according to the preferred embodiments.

FIG. 11 is a flowchart 150 depicting a more detailed and preferred implementation of the gain ramping step 140, the amplitude noise monitoring step 142, and the gain ramp stopping step 144 of the automatic gain adjustment method 100 depicted in FIG. 10. Initially, in preparation to ramp up the gains 140, the I-gain and P-gain are set to different values 152. In addition to being unequal in value, the gain values are also set to a desired fixed ratio 154 that preferably is predetermined.

Thereafter, amplitude noise is determined 156, such as by being sensed, calculated or otherwise measured. For the particular noise level produced at a particular gain or gains setting, a check 158 is made to determine whether feedback loop oscillation is beginning. If not, both gains are ramped 160, preferably by being changed, e.g., increased, converged, diverged, etc. and amplitude noise is once again determined 156. If the onset of feedback loop oscillation has been reached, a noise threshold is set to the value of the amplitude noise 162 and gain ramping is stopped 164.

While amplitude noise preferably is determined in step 156 before any gain ramping occurs in step 160, it should be noted that this order can be reversed if desired. In addition, it should be noted that feedback loop oscillation onset includes not only the case when feedback loop oscillation is beginning or about to begin, it also includes the case where it has already begun for some reason.

To provide an extra safety buffer to further minimize the possibility of tip and sample damage, at least one of the gains, and preferably both of the gains, are reduced 166, i.e., backed off, from the gain value or values when the noise threshold 162 was reached. Each of these reduced gain values are then set as the initial pre-scan gains 168 and the corresponding noise level of these gains also preferably is also kept track of 170, such as by being stored in memory or the like, thereby making it available for reference during the pre-scan. This noise reference preferably advantageously is usable during pre-scanning as a limit by which to ensure initial parameter value settings will not trigger feedback loop oscillation during actual measurement instrument operation.

Figure 12:
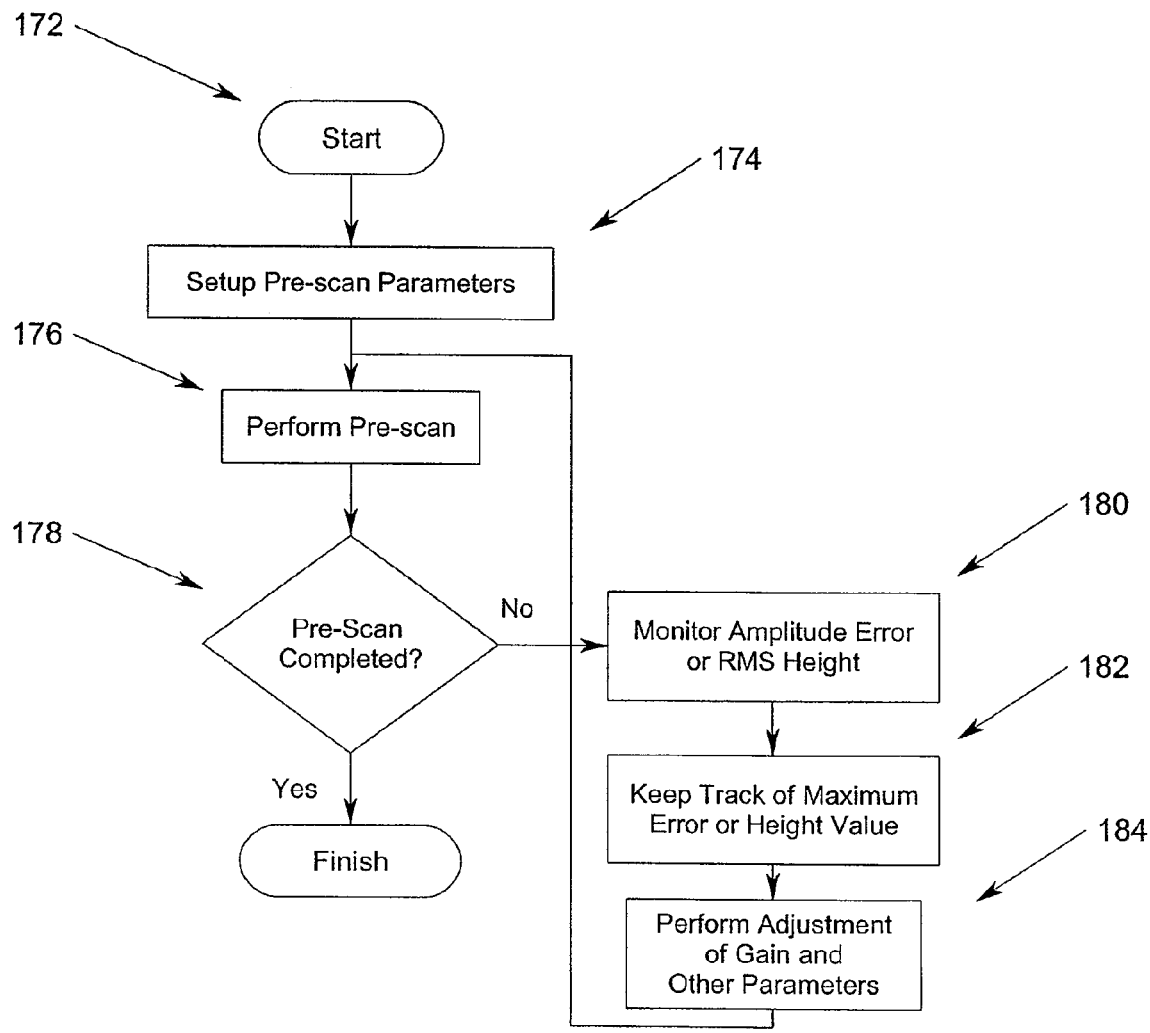
FIG. 12 is a flow chart illustrating a method of pre-scanning a sample according to the preferred embodiments.

A preferred implementation of the pre-scan step 102 (FIG. 6) is illustrated by the flowchart 172 of FIG. 12. If any pre-scan parameters were not previously set, they can be done so in step 174. In one preferred method implementation, certain pre-scan parameters are set-up 174, the tip is engaged with the sample and the pre-scan is performed 176, amplitude error or RMS height are monitored 180, the maximum amplitude error and/or height value is stored 182, gain adjustment, to the extent any is needed, is performed 184, until completion of the pre-scan 178. Besides gains, other parameters can be adjusted in 184 and include the Z-limit, setpoint, scan rate, height channel display data scale, etc. When the pre-scan is completed, the measurement instrument is ready for actual operation such that operational parameters, including gains, have been optimized in a manner that maximizes image sample quality during actual operation.

The pre-scan setup parameter step sets any parameters not previously set and therefore may not always be needed in cases where all pre-scan parameters were previously set. However, in the preferred method implementation depicted in FIG. 12, one or more of the scan size, operating setpoint, and scan rate are set to a fixed value preferably determined to provide sufficient information during the pre-scan to optimize the desired parameters while minimizing the time it takes to complete the pre-scan. Certain scanning modes preferably are also set, including setting scan resolution to its lowest available mode that will still achieve these goals as well as switching the measurement instrument to bi-directional scanning mode.

The fixed value settings are at least initial values as the method of the invention contemplates being capable of automatically changing one or more of these settings during pre-scanning preferably to optimize each such setting. Additionally, those values that are set before engaging the tip to the sample and beginning the pre-scan are automatically set and can be obtained from memory storage, a computer readable disk, or the like, and can be read from a lookup table or data table, if desired. Such memory storage, computer readable disk, etc. can be located onboard the measurement instrument controller or be part of a separate computer having a processor configured to carry out one or more of the steps of the method of the invention. Such a computer preferably is linked, either directly or wirelessly, to the measurement instrument, preferably to its controller, and can be part of a computer network if desired. Moreover, if desired, such a computer can be remotely located and connected via a telephone link, via the Internet, via FTP, or via another communication arrangement.

Setting the measurement instrument to low resolution mode for bi-directional scanning minimizes the amount of time it takes to complete the pre-scan and move on to actual measurement instrument operation. Where a measurement instrument has more than one low resolution mode, the lowest resolution mode that provides sufficient information during scanning to optimize the desired parameters optimized during the pre-scan is chosen. The same is also true for any of the other pre-scan parameters.

Each parameter set prior to the pre-scan preferably is set with a primary goal of minimizing the overhead of performing the pre-scan so that it is completed as quickly as possible but remains effective. Another primary goal of the pre-scan is to optimize the values or settings of certain measurement instrument operating parameters to maximize image quality during actual measurement instrument operation. In seeking to achieve this goal, force is limited so it remains low during bi-directional scanning to limit tip damage because tip damage typically results in reduced image quality. To help achieve this goal while simultaneously minimizing the time it takes to complete the pre-scan, applicable pre-scan parameter settings limit the pixels per scan line and the number of scan lines to less than the pixels per scan line and number of scan lines minimally required to obtain a standard image of the same sample. For example, where a standard image of a particular sample is 512 pixels per line and 512 scan lines, pre-scan limits the pixels per line to no more than 10% of the corresponding standard image value and the number of scan lines to no more than 10% of the corresponding standard image value.

Figure 13A:
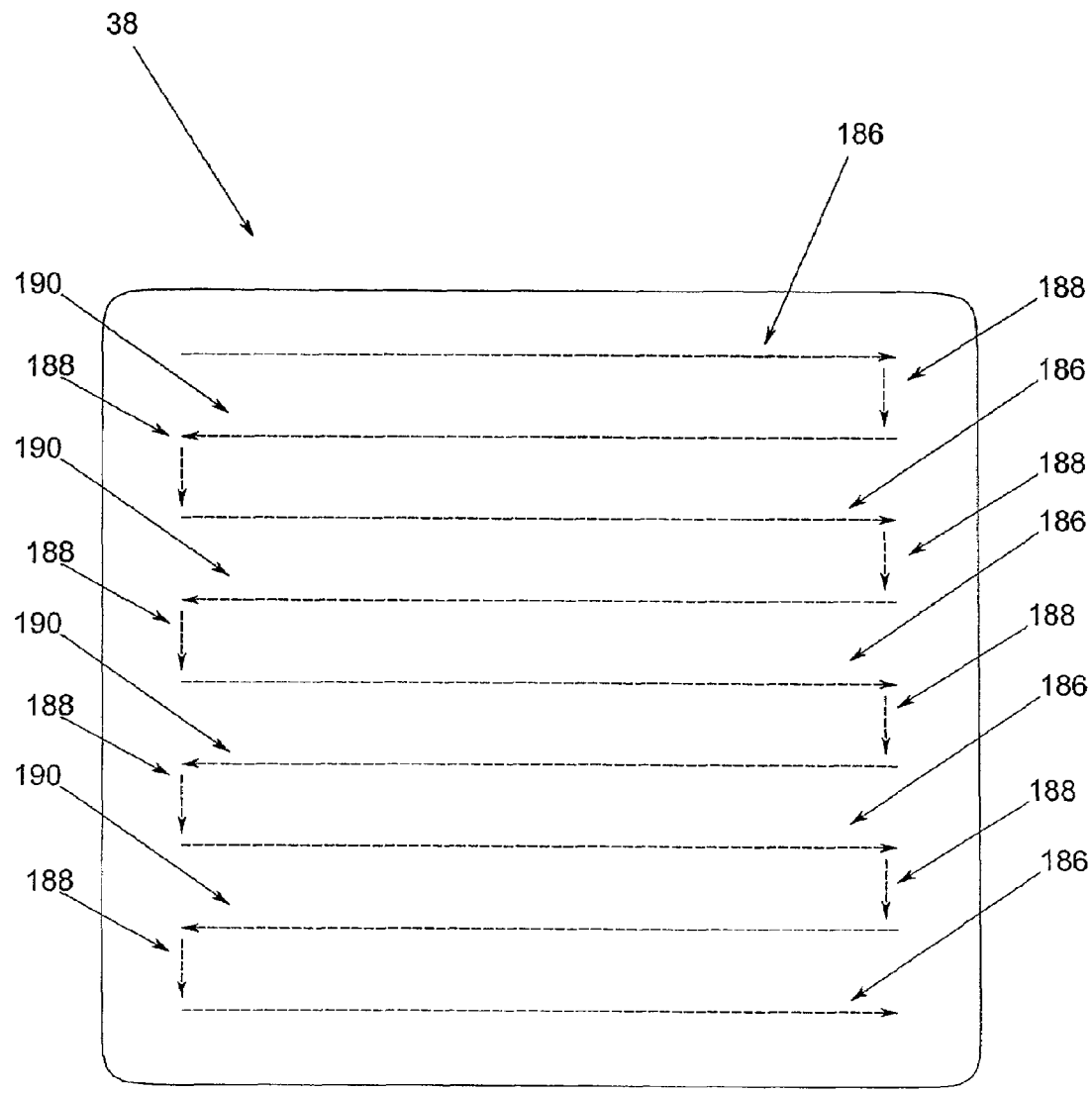
FIGS. 13A and 13B are schematic top views of a sample, illustrating two implementations of relative raster scanning motion between the probe tip and sample.

During the pre-scan 176, the probe is engaged with the sample so as to interact with the sample. Referring additionally to FIGS. 13A and B, the probe scans or rasters along the sample area 38 in a zig-zag pattern. As is shown in FIG. 13, to reduce pre-scan time, the tip (not shown) interacts with the sample 38 as it travels making a single scan pass 186 a given distance in one direction. In the present example, the scan pass 188 is in a horizontal direction along the width of sample area 38. (The reference to a horizontal direction is for clarity in discussing the drawings, but is not intended to imply a specific required scan direction relative to the sample. The scan pass may be oriented in any direction that is substantially in the plane of the sample.)

Once a scan pass 188 is completed, the probe is jogged in a transverse direction for a section 190 based on the spacing dictated by the parameter setting the number of scan lines for the pre-scan. Thereafter, another scan pass 188 is made in a direction substantially opposite to the preceding scan pass 190. Scanning proceeds accordingly in such a back and forth manner until the scan size 104 (FIG. 7) of the sample area 38 is pre-scanned. Note that this raster scan can be created by moving the probe, the sample, or any combination thereof. The only requirement is that relative translation be created between the probe and sample.

Figure 13B:
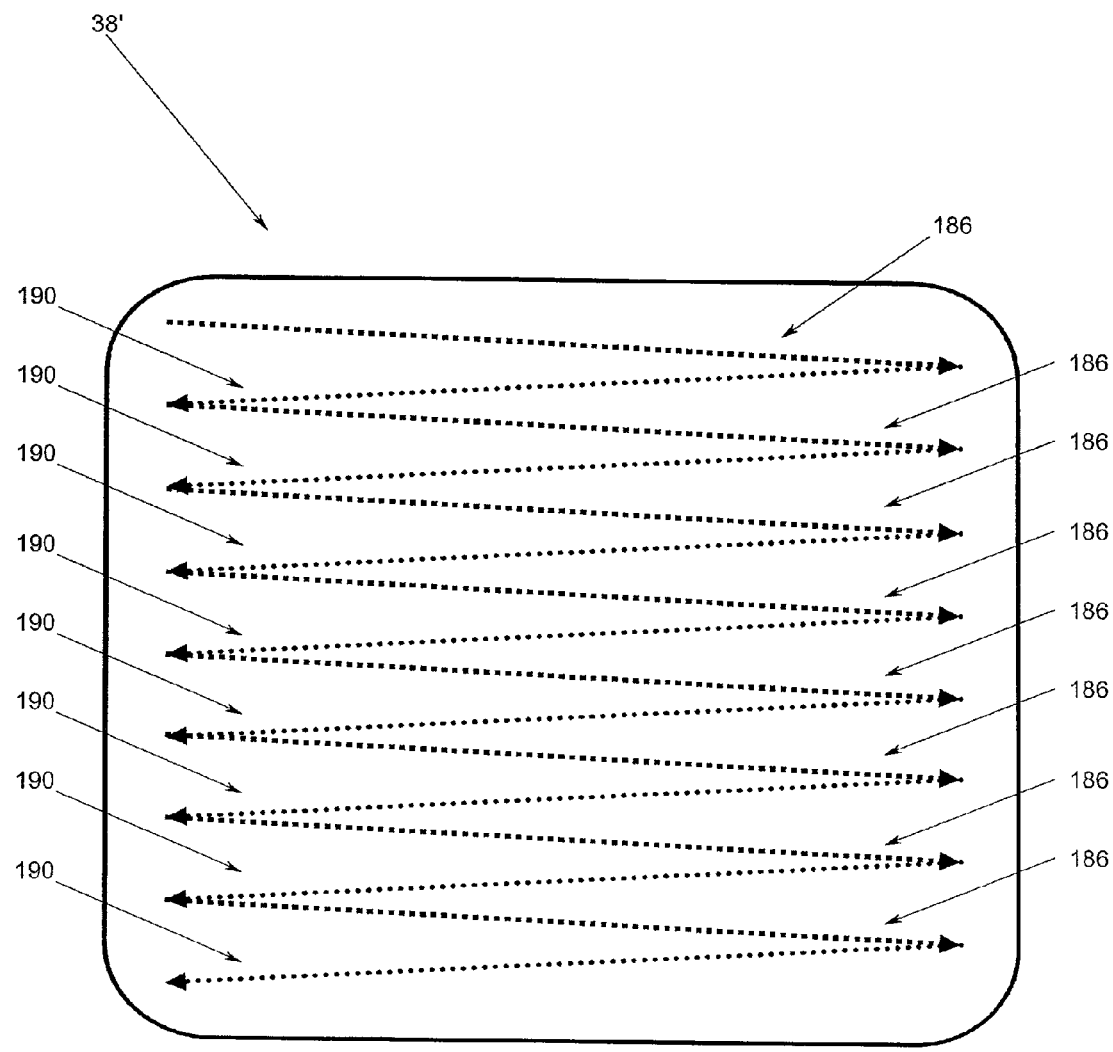

An alternative version of raster scanning in FIG. 13B. In this version, the scan passes are at a slight angle from the horizontal direction. The forward scan pass 186 traverses a horizontal distance substantially similar to the scan size, but also moves a small amount in the vertical direction (as one views the page) in parallel with the horizontal motion. The net result is a slightly angular scan pass. Next the reverse scan 190 is made in substantially the opposite horizontal direction, but also with a small vertical motion. The amount of vertical motion for forward and reverse scans is determined by the vertical scan size and the number of lines in the image. For example, a 1 μm×1 μm scan area with one hundred forward scan passes 186 and one hundred reverse scan passes 190 would have a vertical motion in each scan pass of 1 μm/200 lines=0.005 μm=5 nm. The resulting off-axis angle would be roughly 0.3 degrees. (This example is for illustration and is not intended to limit the number of scan lines or amount of off-axis motion.)

Note that the vertical separation between scans in FIGS. 13A & B are highly exaggerated for clarity. In practice, the forward scan pass 186 and reverse scan pass 190 cover substantially similar regions of the sample. In practice the requirement is that substantially similar features of the sample surface are measured in both the forward scan pass 186 and reverse scan pass 190 such that the measured data of the similar features can be compared. Further, for the purposes of this application, forward scan pass 186 and reverse scan pass 190 should be considered to be in "substantially opposite directions," despite the small off-axis angle differences.

During pre-scanning, amplitude error or RMS height is monitored 180 and each time a new maximum value is reached, it is stored. Using this information, adjustment of at least one and preferably both of the I-gain and P-gain is performed after pre-scan. Alternatively, gain adjustment can also be optimized in real-time in an ongoing manner during pre-scanning.

Where tracking analysis is performed, at least a plurality of the horizontal scan passes 186 is modified so each is bi-directional, i.e., such that the scan travels back and forth at least once along the same horizontal scan line, as discussed in more detail below and exemplified in FIGS. 22 and 23, instead of the unidirectional horizontal scan passes 186 depicted in FIG. 13. While substantially the entire outer surface of the sample 38 may be pre-scanned as shown in FIG. 13, it is more typical that the pre-scan size be substantially less than the surface area of the outer surface of the sample.

Figure 14:
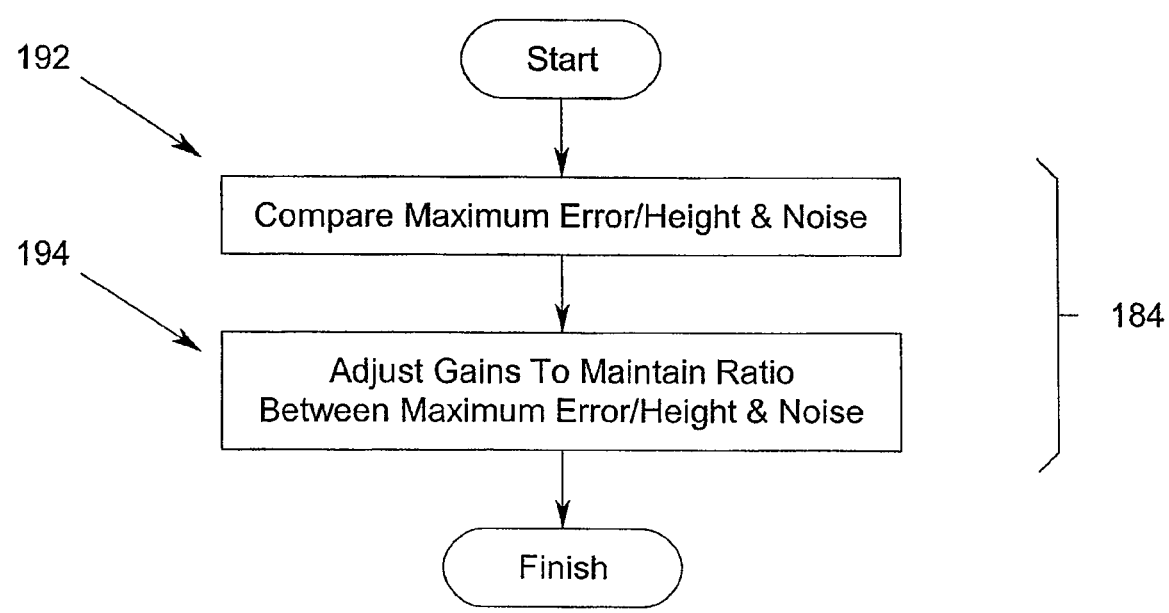
FIG. 14 is a flow chart illustrating a method of performing gain adjustment according to the preferred embodiments.

FIG. 14 illustrates one preferred implementation for performing gain adjustment 184. In performing gain adjustment 184, the recorded maximum error/height value is compared against an amplitude noise level, preferably the level corresponding to the maximum. Thereafter, the gains are adjusted in step 194 based on these parameters.

Figure 15:
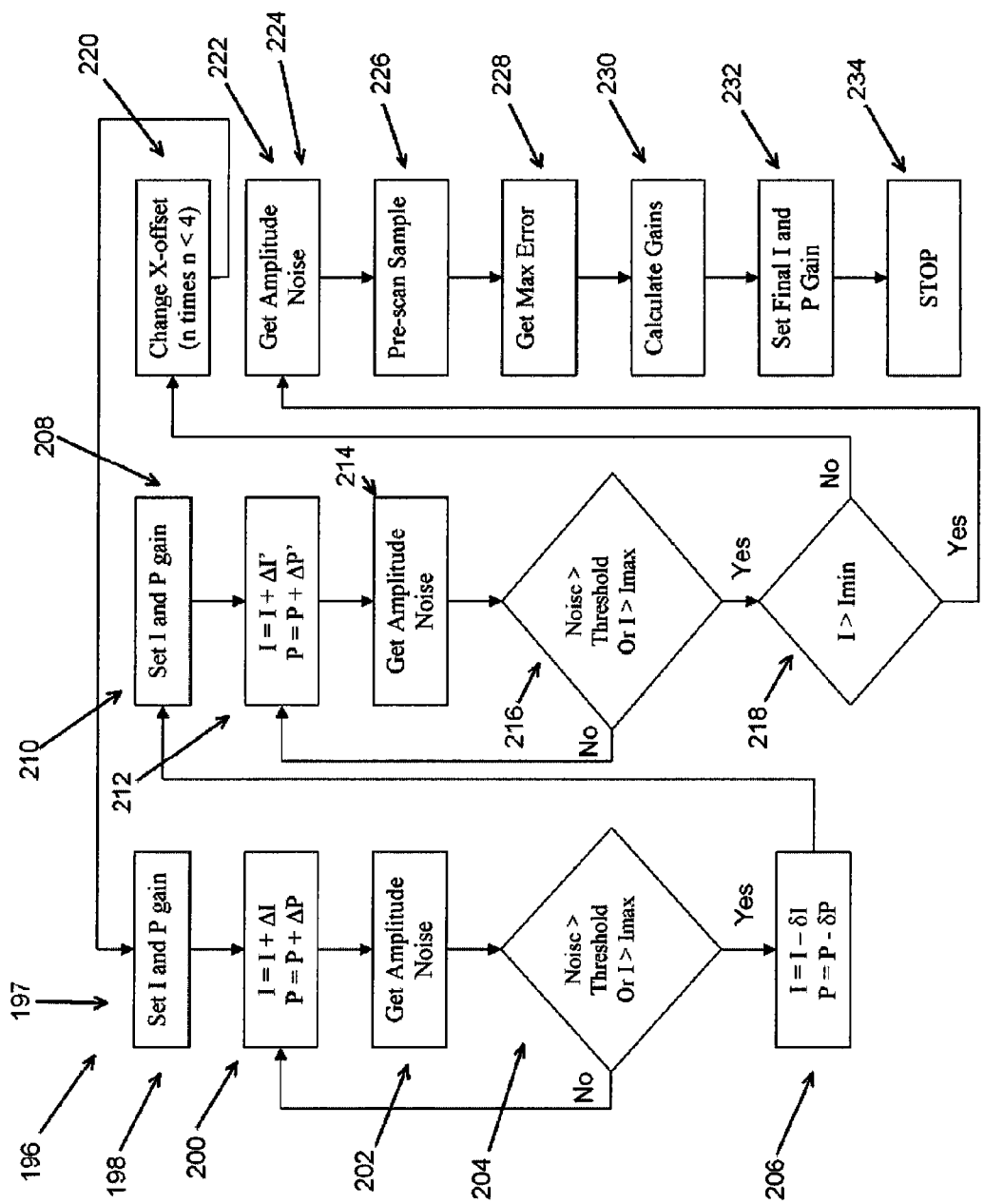
FIG. 15 is a flow chart illustrating a method of automatically setting system gains using automatic gains tuning according to the preferred embodiments.

Preferably, the gains are adjusted in step 194 as needed to achieve a fixed maximum error/height—noise level ratio. This is because the relationship between the gains and maximum error/height is generally linear where the scan rate, scan size and setpoint are fixed. FIG. 15 illustrates a currently preferred implementation of a method 196 for setting the gains that includes automatic gains tuning that takes place before pre-scanning the sample as well as any automatic gains tuning or self-optimizing adjustment that is performed during pre-scanning. I-gain and P-gain are set in step 198. At first, they are preferably set to an initial safe value. For example, as previously discussed, both preferably are set so they are different from each other. In at least one preferred embodiment, the values chosen for the gains are set to a desired predetermined ratio that preferably is fixed.

In ramping up the gains 200, the value of each gain is incremented by a certain amount. As is shown in FIG. 15, the I-gain is incremented by ΔI and the P-gain is incremented by ΔP. Thereafter, the amplitude noise level is measured 202. If the noise level exceeds a certain threshold or the value of the I-gain exceeds a certain pre-determined maximum 204, both gains are reduced by a certain amount 206. For example, as is depicted in FIG. 15, where either case is met, the I-gain is reduced by an amount, δI, and the P-gain is also reduced by a corresponding amount, δP. If no noise threshold or gain maximum is reached or exceeded, gain ramping continues and each gain is incremented by a corresponding incremental value in step 200.

In each case, δ preferably is a "back off percentage;" a multiplier which reduces both gains by a desired predetermined percentage. This percentage is selected based on routine testing and experimentation to back each gain off enough to provide a safe buffer that they cannot exceed during actual measurement instrument operation. This safety buffer ensures that the measurement instrument simply cannot operate at any gain that produces feedback loop oscillation. This advantageously locks in gains so they always stay at a safe value or within a safe value range. The not-to-exceed threshold gains that result are particularly advantageous where self-optimizing automatic gain adjustment is performed during imaging of the sample 38 during actual measurement instrument operation.

After each gain is backed off from its value when the noise threshold or maximum I-gain was reached or exceeded in step 204, the I-gain and P-gain are set in step 210 at the backed off value calculated in step 206. Thereafter, another automatic gain optimizing loop 208 is initiated to further tune and self-optimize gain. Once again, gains are ramped in step 212 up by incrementing the gains a corresponding desired amount, ΔI' and ΔP', which differs from the increment values previously employed in step 200 of the initial gain tuning loop 197. Preferably, ΔI' and ΔP' are each smaller than ΔI and ΔP, such as to fine tune and more precisely optimize gain.

Amplitude noise is recorded in step 214 and it is compared against a threshold and I-gain with a maximum I-gain value in step 216. If neither is exceeded, gain ramping once again resumes at step 212. If either value is exceeded, I-gain is then compared in step 218 to see if it is greater than a predetermined minimum gain value, $I_{min}$. If it is not, the offset is adjusted in step 220 and the whole automatic gain tuning process is started over returning to initial gain tuning loop 197.

The scan size is set to zero when doing the auto gain adjustment. The reason for changing the X-offset is to prevent that the tip lands on a specific "bad" region on the sample 38, which gives a high amplitude noise even at very low gain settings. Note, that the X-offset is usually a smaller value than the half of the scan size from the user input. The X-offset will be set back to zero after the auto gain adjustment.

However, if I-gain is greater than the predetermined minimum, $I_{min}$, a pre-scan gain-tuning loop 222 is initiated with amplitude noise at the present P-gain and I-gain value being recorded in step 224. This clears the way for pre-scanning to proceed, including any additional pre-scan preparations not shown in FIG. 15, using the final I-gain and P-gain values from loop 208 as initial gain values in loop 222.

Once pre-scanning begins 226, the maximum error and maximum amplitude level are obtained in step 228. In a subsequent step 230, I-gain and P-gain preferably are both calculated based thereon. The gains can be determined used either a look-up table or an equation fitted by the experiment results. For example, one of the possible equation can be used is as following:

Gain factor[$a$*ln(maximum error)]–$b$

From experiment results, the preferred values of "a" and "b" are about 0.35 and 1.

This loop preferably executes in this manner, and can do so recursively (not shown), until pre-scanning is finished 234. When finished, the final I-gain and the P-gain are set 232 and preferably are both based on the highest maximum error and/or maximum amplitude obtained in step 228. It is these final gain settings that will be used during actual measurement instrument operation in actual imaging of the sample 38.

Figure 16:
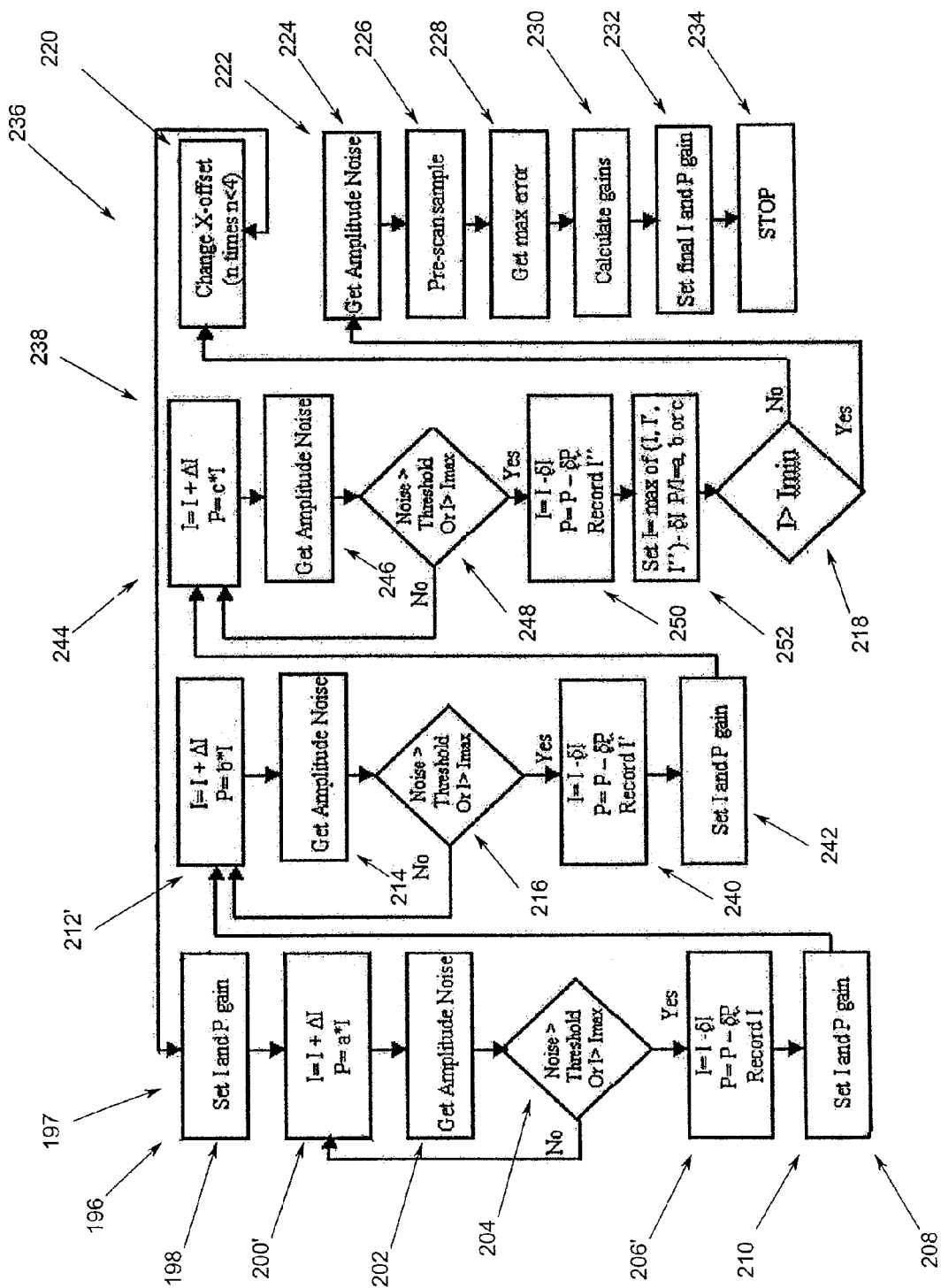
FIG. 16 is a flow chart similar to FIG. 15, illustrating an alternate method of gains tuning.

FIG. 16 depicts another preferred automatic gains tuning method 236 that shares some similarities to the method shown in FIG. 15. For example, the method 236 illustrated in FIG. 16 includes an additional automatic gains tuning loop 238 that takes place just before the pre-scan tuning loop 222 is initiated. Additionally, gain ramping in at least one or more of the loops includes incrementing at least one of the gains based on a multiplier as well as preferably doing the same with the other gain. Moreover, in step 206' not only are I-gain and P-gain backed off, but the value, I, of the I-gain is also recorded, e.g., stored. Further differences are discussed in more detail below with regard to this method that, among other things, sets the initial pre-scan I-gain value to the highest I-gain value obtained from the I-gain values outputted by the three automatic gain tuning loops 196, 208 and 238 employed in the present method 236.

For example, in left-hand side loop 197, P-gain is incremented during gain ramping 200' using a multiplier, a, that is multiplied with an I-gain value, preferred its value at the time the P-gain is further ramped. While coefficient, a, can be selected so the resultant product of multiplication with the I-gain value, i.e., a*I, can be added to the current or prior P-gain value, it preferably is determined such that the multiplied resultant product, a*I, instead replaces P-gain. A similar method of determining P-gain during ramping 212' is performed in the middle loop 208, except a different coefficient, b, is used as the multiplier, and in the right-hand side loop 236, except coefficient, c, is used as the multiplier.

In the right-hand side loop 208, once the noise threshold or $I_{max}$ is exceeded 216, both gain values are backed off and the I-gain value is stored as variable I'. If desired, I' can be set at the I-gain value, e.g., the maximum I gain value, prior to being backed off and reduced in step 240.

Both I-gain and P-gain are set to their backed off values in step 242 before the right-hand side loop 238 is initiated. Gain ramping 244 is performed and amplitude noise is obtained 246 before determining whether the noise threshold or $I_{max}$ has been exceeded 248. If that is not the case, gain ramping 244 continues on. If either of these values is exceeded, I-gain and P-gain are backed off in step 250 and I-gain is also stored as I" in a manner corresponding to step 240.

Thereafter, I-gain is set 252 at the value of the maximum I-gain, i.e., the greatest of I, I' and I", obtained from each of the three processing loops 196, 208 and 238. If the maximum I-gain determined in step 252 is greater than a threshold minimum I-gain, $I_{min}$, per step 218, then the pre-scan gains tuning loop 222 is initiated. Otherwise, the offset is changed, e.g., moving the tip to another area within the sample 38, and the whole automatic gains tuning method 236 is executed all over again from the beginning.

Figure 17:
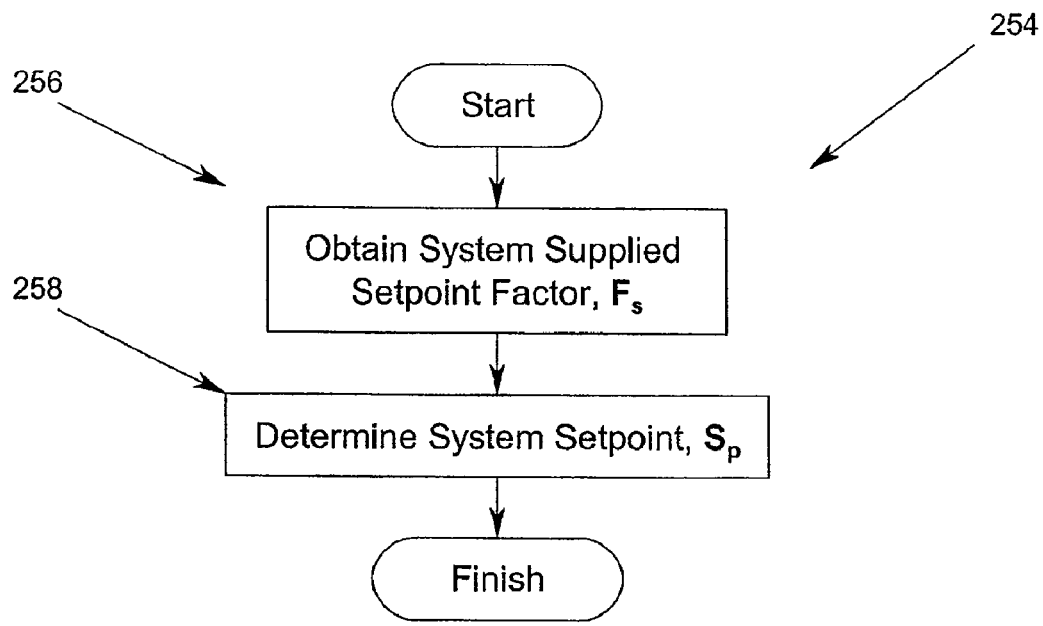
FIG. 17 is a flow chart illustrating determining system setpoint according to the preferred embodiments.

FIG. 17 illustrates a method 254 of setting the measurement instrument operating setpoint, $S_p$, in preparation for pre-scan. A system supplied setpoint factor, $F_s$, is obtained or otherwise determined in step 256 before it is used in determining the setpoint in step 258. As is discussed in more detail below, the setpoint, $S_p$, ultimately obtained may well be provisional as it may be subject to adjustment, e.g., automatic optimization, which can be performed along with automatic gain tuning as well during the pre-scan.

Figure 18:
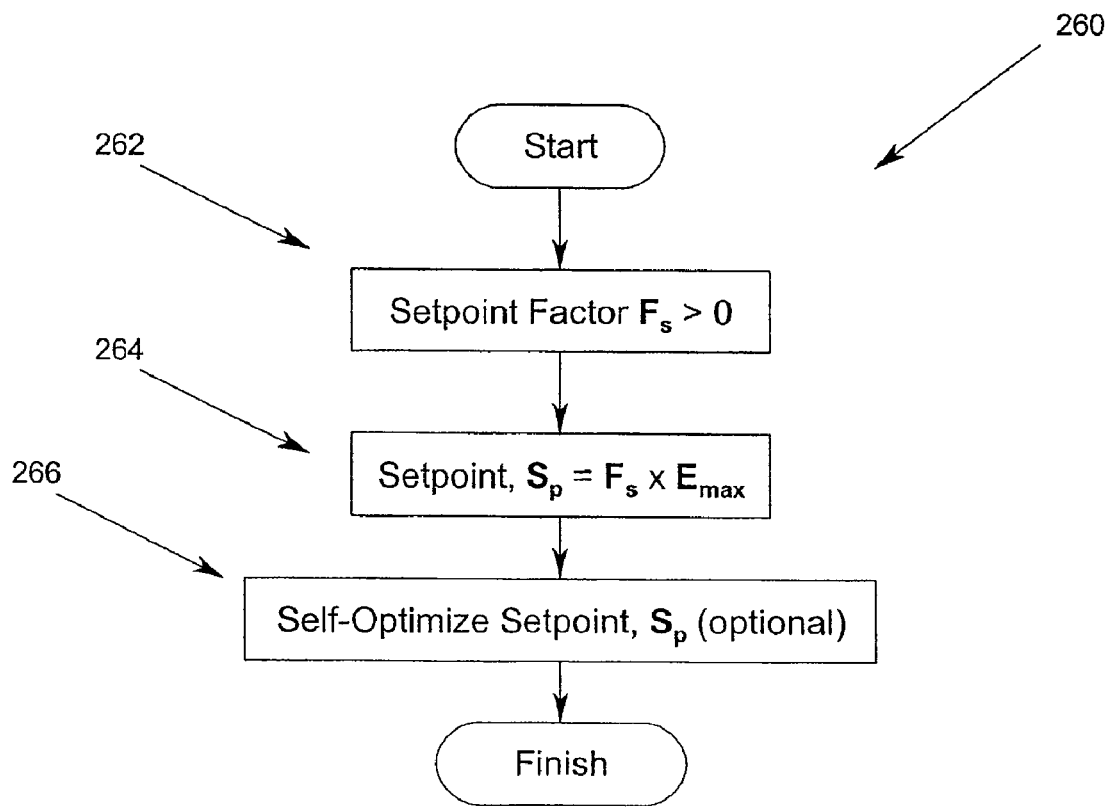
FIG. 18 is a flow chart illustrating a method of self-optimizing a system setpoint according to the preferred embodiments.

FIG. 18 illustrates a currently preferred implementation 260 of the operating setpoint determination method 254 depicted in FIG. 17. In step 262, the setpoint factor, $F_s$, is set to be greater than zero, if not already the case, in step 256. Thereafter, the operating setpoint, $S_p$, is calculated in step 264 as the result of the following equation:

$$S_p = F_s \times E_{max}$$

where:
$S_p$ is the provisional operating setpoint setting,
$F_s$ is the setpoint factor, and
$E_{max}$ is a maximum error.

$E_{max}$ preferably is the maximum error signal (e.g., amplitude) obtained, for example, in step 182 of the method depicted in FIG. 12 and/or in step 228 of the methods depicted in FIGS. 15 and 16. The setpoint, $S_p$, is designated as provisional because it can be altered as a result of application of tracking control before actual imaging operation begins as discussed in more detail below.

Where the measurement instrument is being setup for oscillatory mode operation, namely TappingMode™ operation, operating setpoint related setup further includes a free cantilever oscillation amplitude value, $A_f$ or $A_g$, which is automatically obtained, such as from a lookup table, data table, or other data storage arrangement, or determined, such as by calculation or the like. The value obtained, namely either $A_f$ or $A_g$, is automatically selected in carrying out the setpoint determination method depending upon whether the operator previously manually selected the "High Speed," i.e., fast (FIG. 7), or "Low Force," i.e., gentle (FIG. 7), operational mode. For example, $A_f$ is used when the "High Speed" operational mode is manually selected and $A_g$ is used when the "Low Force" operational mode is manually selected.

Figure 19:
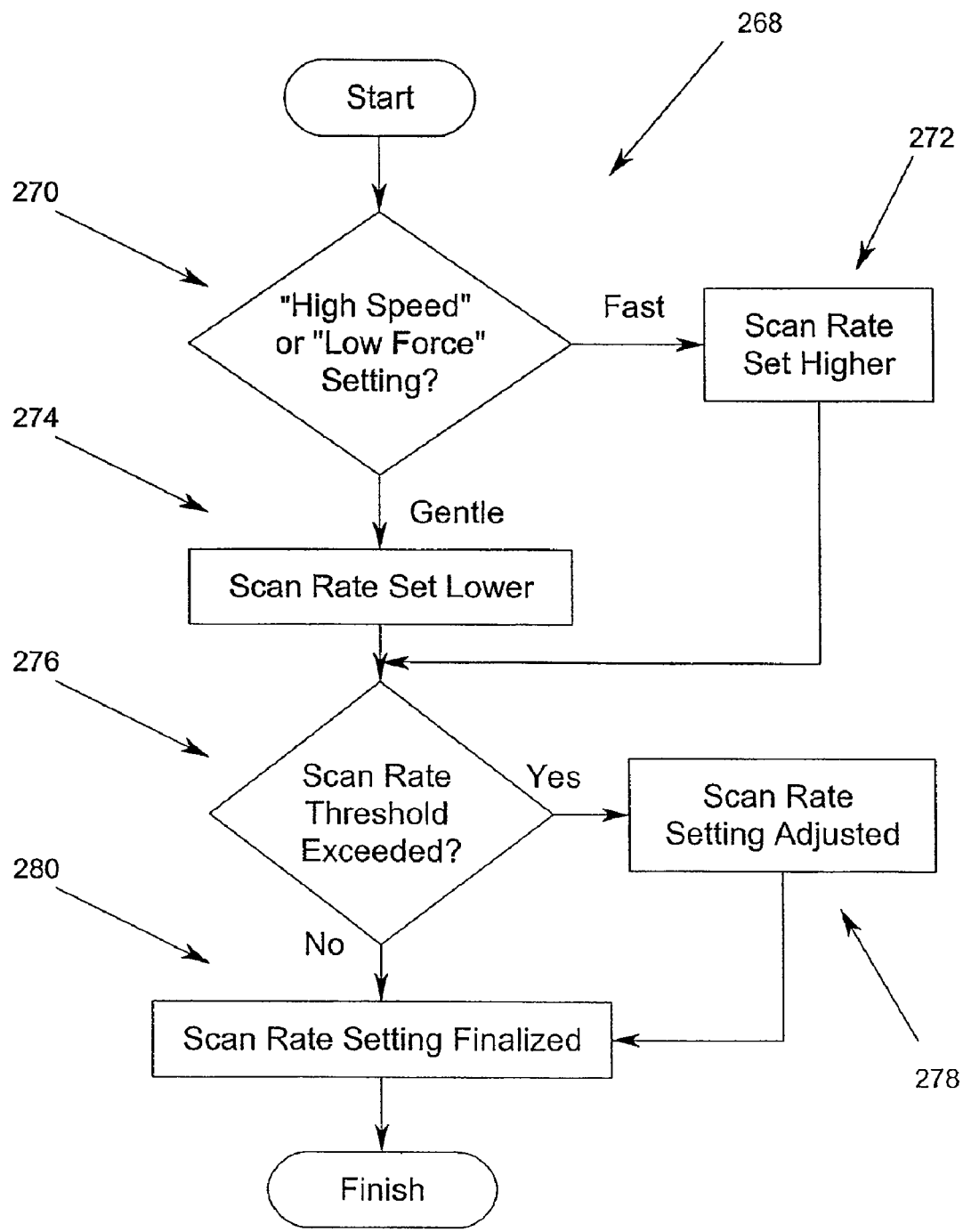
FIG. 19 is a flow chart illustrating a method of setting scan rate and scan speed according to the preferred embodiments.

FIG. 19 illustrates a preferred implementation of a method 268 for setting scan rate and scan speed. For sake of simplicity, only scan rate is addressed because scan rate and scan speed are interrelated according to the following equation:

Scan Size÷Scan Rate=Scan Speed

Since scan size is previously manually entered 104 (FIG. 7) by the operator, the above interrelationship between scan rate and scan speed means that obtaining the value of one of the other two parameters, namely scan rate or scan speed, automatically results in the value of the other one of these parameters being provided.

In determining the value to which scan rate should at least be initially set in the preferred but exemplary method 268 depicted in FIG. 19, it is first determined in step 270 whether the operator manually selected the "High Speed," i.e., "fast," or "Low Force," i.e., "gentle" pre-scan force setting. For example, referring once again to reference numeral 106 of FIG. 7, if "High Speed" was previously set, such as by operator selection, decision branch 270 sets the scan rate, or at least causes scan rate to at least initially be set, higher in step 272 than in the case where "Low Force" was previously set. Thus, if pre-scan force is set to the "Low Force" setting, decision branch 270 sets scan rate, or at least causes scan rate to initially be set, lower in step 274 than for the "High Speed" case.

Particularly in the case where the value of the scan rate setting is also dependent on some other factor such that it can differ for a given "High Speed" or "Low Force" pre-scan operator setting, a check is made in step 276 to determine whether the initial scan rate setting exceeds a known predetermined threshold. For example, if the value of the initial scan rate setting made in either step 272 or 274 produces a scan speed too great for a given operator set scan size (e.g., per the scan speed equation above) such that the risk of tip or sample damage is too high, the scan rate setting is adjusted accordingly in step 278, preferably by reducing the scan rate setting, before finalizing the setting in step 280. However, if the threshold is not exceeded in step 276, no further scan rate adjustment is needed and the scan rate setting is finalized.

It should be noted for the "Low Force" case that step 276 may not be needed, e.g., skipped, where the scan rate is set sufficiently low enough in step 274 that there is almost no risk of tip or sample damage. Where such is the case, the scan rate is set to a low setting in step 274 before immediately preceding to step 280 where the scan rate setting is adopted.

Alternatively, the "High speed"/"Low force" selector can be as a form of slide bar control, in which the user can choose some intermediate values and all the parameters settings related to the "High speed"/"Low force" switch will be obtained from data storage or the like, such as of the type capable of being retrieved from a lookup table, data table or the like.

For example, the following tuning free amplitudes and setpoint reduction factors can be used depending on the higher force or lower force selector:

|  | Tuning Amplitude (V) | Setpoint Factor (%) |
| --- | --- | --- |
| High speed/Force | 2.0 | 70 |
| ↓ | 1.8 | 75 |
| ↓ | 1.5 | 80 |
| ↓ | 1.0 | 85 |
| Low speed/Force | 0.7 | 90 |

While the threshold can be based on calculation, such as calculations that estimate tip force or some other aspect of pre-scan force, the threshold is a value obtained from data storage or the like, such as of the type capable of being retrieved from a lookup table, data table or the like. Such a threshold can be determined based on routine testing and experimentation and can also be based on the type of measurement instrument. For example, where the measurement instrument is an SPM, the threshold might be different when the SPM is an AFM as opposed to when it is an STM.

In addition, while reference numeral 280 refers to finalizing the scan rate setting, it should be recognized that some other characteristic, parameter, function or additional method implementation can cause even this "finalized" scan rate setting to be adjusted. For example, as is discussed in more detail below, where tracking metrics are analyzed, such as during the pre-scan, the scan rate setting finalized in step 280 can be adjusted, preferably optimized, as a result tracking metrics analysis.

Figure 20:
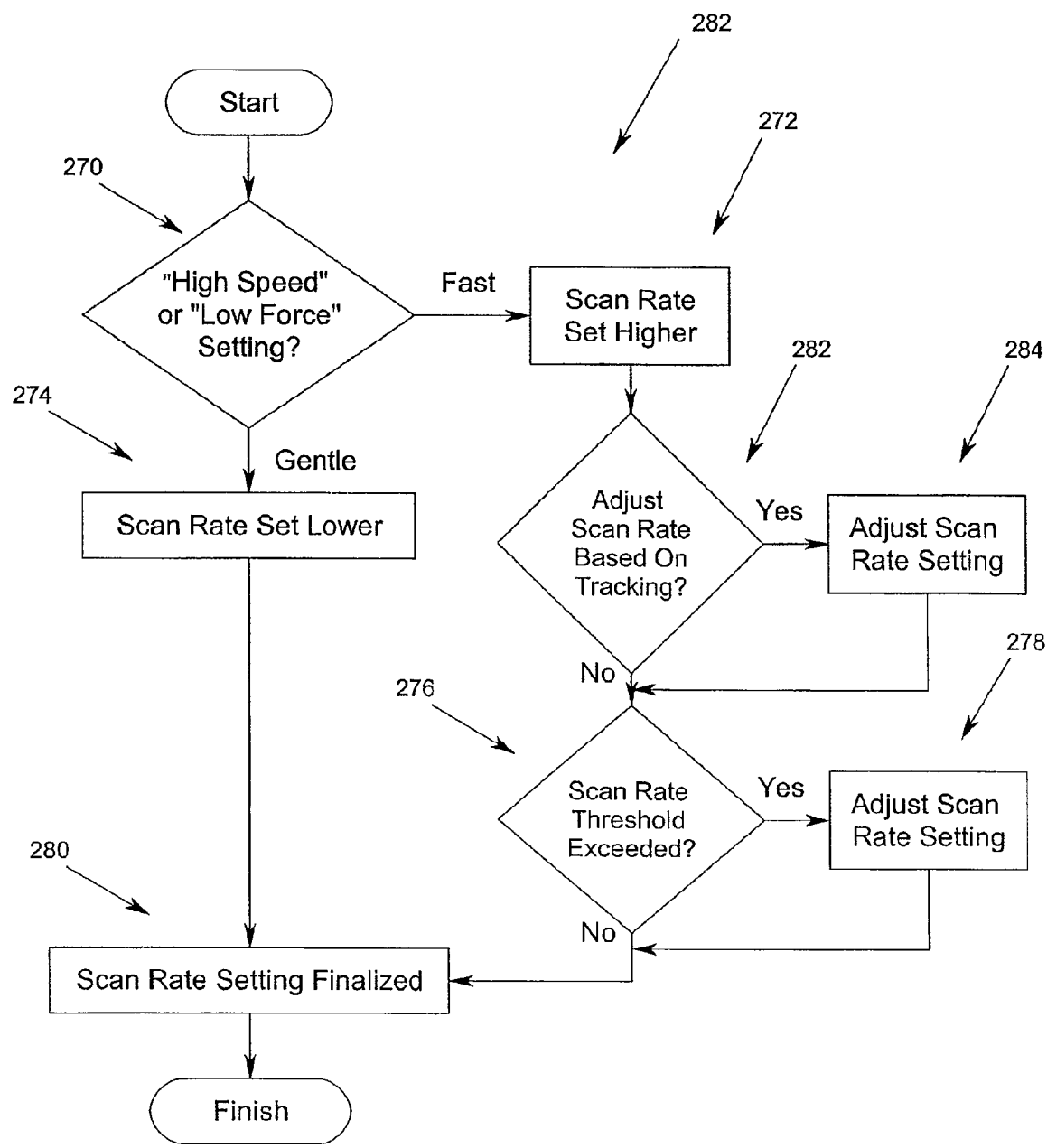
FIG. 20 is a flow chart illustrating another method of setting scan rate according to the preferred embodiments.

FIG. 20 depicts a currently preferred implementation of a scan rate setting method 282. Where the "Low Force" or "gentle" pre-scan setting is in effect, the scan rate is set lower 274 than it would be set for the case where the "High Speed" or "fast" pre-scan setting is in effect. Thereafter, since the scan rate is set sufficiently low enough in this particular case that the risk of tip or sample damage is low, the scan rate setting is finalized in step 280.

Where the "High Speed" or "fast" pre-scan setting is in effect, the scan rate is set higher 272 than it would be set for the case where the "Low Force" or "gentle" pre-scan setting is in effect. This scan rate setting can be adjusted based on subsequent analysis from monitoring probe tracking 282 during the pre-scan. Since tracking analysis will not always have taken place at this point, the scan rate set in step 272 can be provisional until tracking analysis is performed during the pre-scan. In addition, this method, along with the method depicted in FIG. 19, contemplate an automatic setup method implemented in accordance with the invention that may lack any kind of tracking analysis performed during measurement instrument setup or which selectively employs tracking analysis during setup.

Scan rate preferably is adjustable during pre-scan when tracking analysis is being performed. As is discussed in more detail below, the scan rate at which the best tracking metrics occur preferably is used to adjust the scan rate setting in step 284 to optimize. Preferably, the scan rate setting is adjusted in step 284 by setting it to the scan rate of whichever tracking scan performed during pre-scan that produces the best metrics. For example, in one preferred implementation, the scan rate is optimized in step 284 by setting it to the scan rate during the tracking scan that produced the highest tracking metric.

Thereafter, whether or not tracking impacts the scan rate setting, the scan rate setting is compared against a threshold, such as in the manner discussed with regard to FIG. 19, to determine in step 276 whether the scan rate is greater than the threshold. If so, the scan rate setting is adjusted in step 278 by reducing it below the threshold. If not, the scan rate setting is finalized at least in preparation for the pre-scan, if not in preparation for actual sample imaging. For example, for the "High Speed" or "fast" case, where tracking has been performed the final scan rate setting in step 280 is the scan rate that will be used during actual measurement instrument operation.

Alternatively, the scan rate can be determined by a lookup table or an equation as follows: Scan rate=a*exp (b*maximum error amplitude)/[Sqrt(Scan size)] with a and b have preferred values of 11 and $-6 \times 10^{-4}$, respectively.

Figure 21:
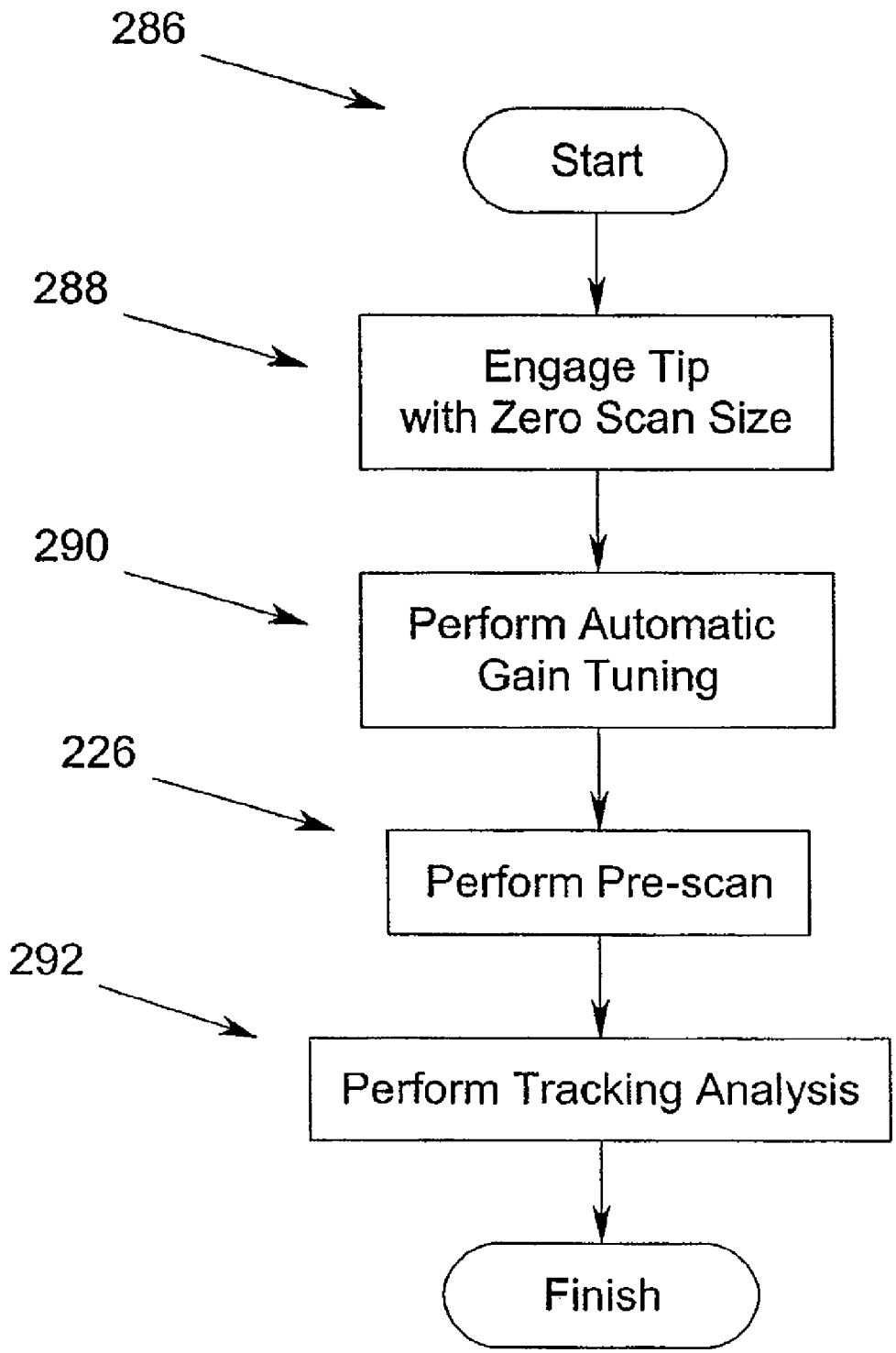
FIG. 21 is a flow chart illustrating a method of optimizing AFM operation using tracking analysis, according to a preferred embodiment.

While pre-scan was previously discussed with regard to FIGS. 12-16, it was done so in the context where tracking analysis and related optimization was either not required or not performed. In contrast, FIG. 21 presents a flowchart 286 depicting a preferred implementation of a pre-scan method in accordance with the present invention that includes performing tracking analysis and related optimization. Tracking analysis is employed to determine whether tracking during the pre-scan is good or poor. If it is poor, the values of one or more operating parameters, such as one or more gains, operating setpoint, and/or scan speed or rate, are adjusted during the pre-scan to try to improve tracking. As a result, one or more of these parameters are optimized and tracking is improved thereby improving image quality and consistency during actual measurement instrument operation.

During pre-scan, the tip of the probe is engaged with the sample and stays at one point of sample surface with zero scan size. During this time, automatic gain tuning is also performed 290 to optimize one or both of I-gain and P-gain. After the gain tuning, the tip starts to pre-scan on the sample with the user input scan size. Finally, tracking analysis is also performed 292 during the pre-scan to determine or optimize at least a plurality of measurement instrument operating parameters, including preferably scan rate or scan speed, based on such parameter settings when the best tracking metrics are obtained.

Figure 22:
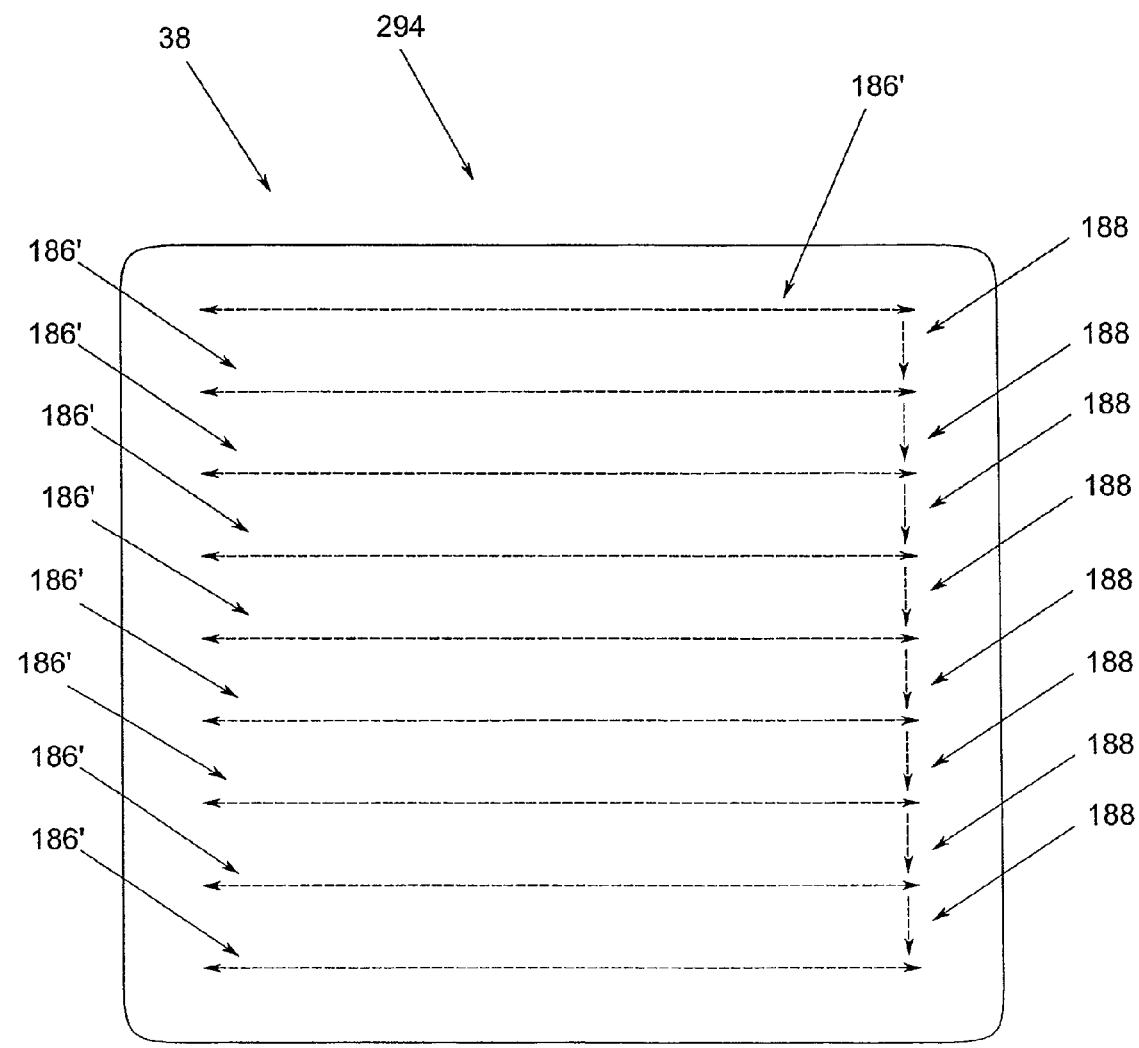
FIG. 22 is a schematic top view diagram of a sample illustrating bi-directional scanning as part of tracking analysis.
Figure 23:
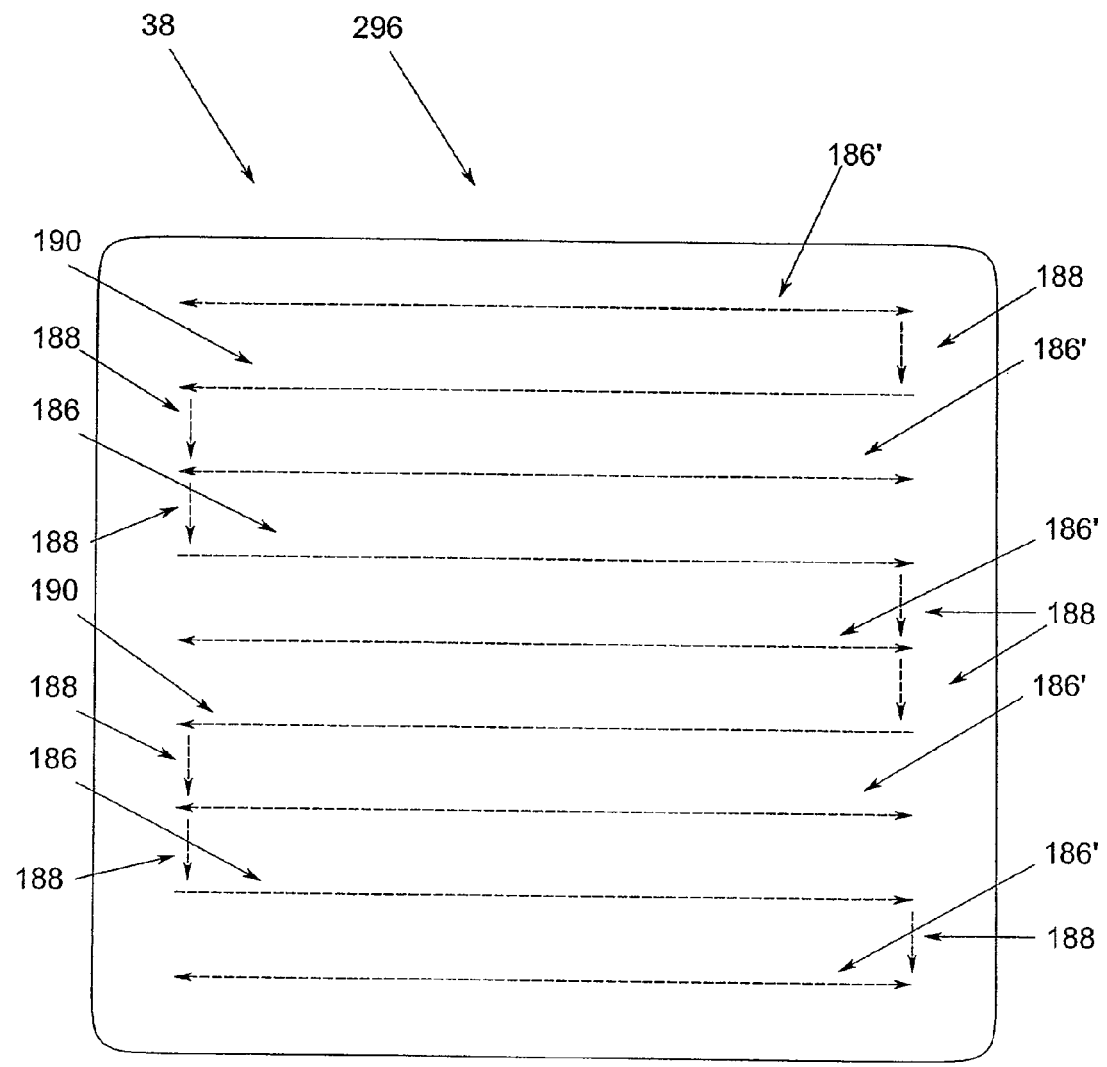
FIG. 23 is a view similar to FIG. 22 illustrating an alternate scanning pattern.

While FIG. 13 previously discussed discloses one type of pre-scan scanning pattern that can be used where bi-direction tracking analysis isn't being performed, FIGS. 22 and 23 illustrate two examples of pre-scan scanning patterns well suited for tracking analysis and optimization. FIG. 22 illustrates a pre-scan scanning pattern 294 where each and every scan pass 186' is a bi-directional tracking scan from which information can be obtained to perform tracking analysis and optimization. The spacing of the transversely extending jogs 188 can be varied, such as when it is desired to increase tracking scan density, and have been set so adjacent tracking scans 186' are spaced well enough apart to facilitate drawing clarity. Routine testing and experimentation can be employed to determine optimal spacing between adjacent tracking lines as the spacing can be fixed or vary depending on the circumstances, application and other factors.

FIG. 23 illustrates a similar pre-scan scanning pattern 296 where every other scan pass 190 is a single-direction or unidirectional scan pass 190 where no tracking analysis is performed. The remainder of the scan passes 186', which is each scan pass 186' disposed between a pair of unidirectional scan passes 190, are bi-directional tracking passes.

Figure 24:
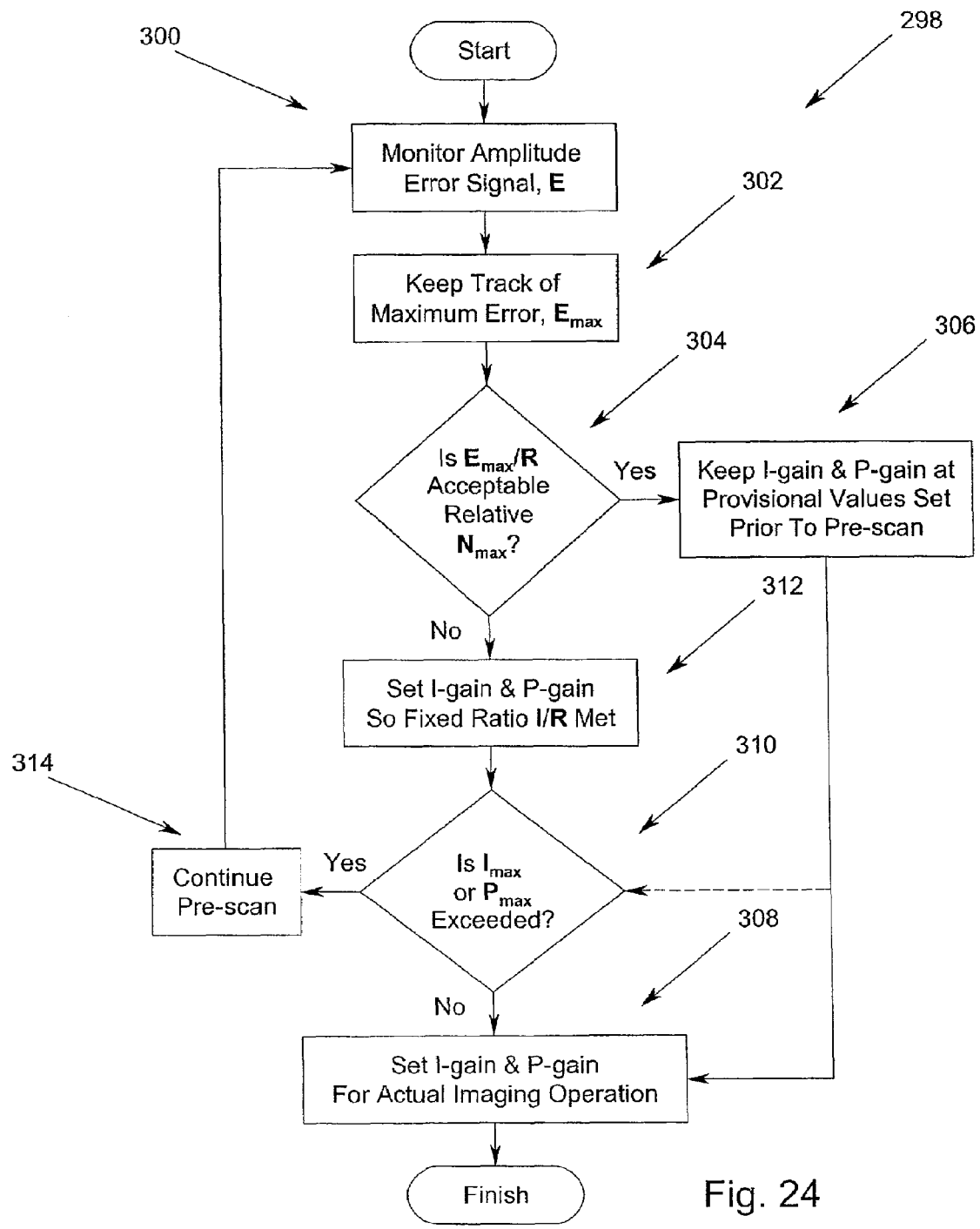
FIG. 24 is a flow chart illustrating a method of setting and preferably optimizing gains during the pre-scan, according to the preferred embodiments.

FIG. 24 illustrates a preferred method 298 of setting and preferably optimizing gains during the pre-scan, steps 224-232 of which are depicted in FIGS. 15 and 16 in less detail. In the present method 298, the amplitude error signal, E, is monitored 300 during each scan pass, 186' and/or 190 of the pre-scan. The maximum error, $E_{max}$, obtained is kept track of in step 302 by storing it in memory, e.g., memory register or storage location, storing it on computer readable media, or storing it in some other manner. $E_{max}$ preferably is continually updated as needed as the pre-scan progresses such that when the pre-scan is completed $E_{max}$ represents the highest value of the amplitude error signal measured of all of the scan passes of the pre-scan.

Thereafter, in step 304 the maximum error, $E_{max}$, is divided by a predetermined fixed ratio, R, and compared against the maximum amplitude noise, $N_{max}$, measured to determine if the $E_{max}/R$ ratio is acceptable. While $N_{max}$ can be the maximum noise value measured during that part of the automatic gain tuning method that takes place prior to the pre-scan, in the preferred method depicted in FIG. 24, $N_{max}$ preferably is the maximum noise value obtained during the pre-scan.

In one preferred implementation of the method 300 not shown in FIG. 24, the product, $E_{max}/R$, is acceptable if it falls within a certain desired range or buffer zone of $N_{max}$. For example, in a currently preferred implementation, $E_{max}/R$ is acceptable only if it falls within a predetermined proximity, p, of the maximum noise value, $N_{max}$.

If acceptable, the I-gain and P-gain are kept at their current settings 306, which preferably are the same settings to which they were provisionally set during the automatic gain tuning that took place before initiation of the pre-scan. Preferably, these settings will then be used during actual measurement instrument operation 308. However, if desired, as is shown in dashed line in FIG. 24, the gains can be checked in step 310 to determine whether I-gain exceeds $I_{max}$ or P-gain exceeds $P_{max}$. These maximum values can be calculated or otherwise obtained, such as during automatic gain tuning prior to pre-scan or retrieved from a lookup table, data table, memory storage location, or the like.

If unacceptable, I-gain and P-gain preferably are set in step 312 so the fixed ratio I÷R or (I-gain or P-gain)÷R is met. For example, if desired, I-gain can be set so the fixed ratio I-gain÷R is met and P-gain can be set so the fixed ratio P-gain÷R is met. In another preferred implementation, the values of both gains are chosen so the fixed ratio I-gain÷R is met.

Thereafter, a check is made in step 310 whether the I-gain exceeds $I_{max}$ and whether the P-gain exceeds $P_{max}$. If either is exceeded, the pre-scan continues 314 such that another iteration of the gain tuning loop of method 298 is carried out during the pre-scan. Although not shown in FIG. 24, whichever gain exceed its maximum preferably is reduced to a value no greater than the maximum. If desired, this can be done to both gains, whether or not both exceeded their corresponding gain maximum. Preferably, at least the exceeding gain is backed off a certain amount or a certain percentage so as to set it to a value less than the maximum.

If neither gain exceeds its respective maximum value, $I_{max}$ and $P_{max}$, the current values for I-gain and P-gain are then set in step 308 as the gain values to be used during actual measurement instrument operation. Preferably, in at least one preferred implementation, the gains ultimately selected for actual use are those closest in proximity to $N_{max}$, which can also apply with regard to the respective maximum gain of each so long as the maximum gain is not exceeded.

In addition, when performing an actual image scan during measurement instrument operation, the value for the Z-limit is automatically adjusted if its associated current maximum error signal, $E_{max}$-realtime, becomes smaller than its corresponding threshold obtained during the pre-scan. In addition, Z-center position is also monitored and corrected by actuating the Z-stepper motor to the extent needed. Finally, tip wear is continually monitored, including during the pre-scan, so that the operator can be warned as soon as practicable of the increased likelihood that scan image data may be compromised.

Tracking Analysis & Optimization

The method of the present invention can also include tracking analyses during not just the pre-scan but also during actual measurement instrument operation to determine tracking quality. In at least one preferred implementation of a tracking quality method, tracking quality is monitored and the value of one or more operating parameters are adjusted should tracking quality become less than desired. By constantly monitoring and adjusting one or more operating parameters in an effort to maintain good tracking quality, measurement instrument image quality is advantageously improved while desired tip-sample interaction is maximized. Where the method is employed during actual sample imaging, not only is high image quality achieved but high image quality is more consistently obtained over the entire sample because desired tip-sample interaction is maximized over the entire sample.

The goal of tracking is to maintain a desired level of interaction between probe tip and sample by keeping the tip in contact with or as close to the sample surface as is optimally desired, depending on mode of operation, for instance. Where the stylus or probe based instrument is operating in contact mode, tracking seeks to keep the tip in constant contact with the sample throughout the entire sample scanning process. Where the probe is oscillating, such as when operating in TappingMode, tracking seeks to maintain consistent tapping of the sample at the desired level of tip-sample interaction, e.g., according to the setpoint. However, where unwanted or unintended separation occurs between the tip and sample, tracking suffers along with scanned image quality.

Unfortunately, good tracking can sometimes be difficult to achieve. Sometimes tracking can adversely be affected by rough sample topography, making it difficult to maintain consistent tip-sample interaction along the entire sample surface. In other instances, operating parameters have been set to less than optimal values, making it difficult for the probe to track the sample consistently and well. For example, should scan speed be set too high, particularly in light of the particular topography of the sample, tracking can suffer because the tip is moving too fast during scanning to be able to accurately follow the sample topography. Similar tracking problems can occur where one or both gains are set too low or if the setpoint chosen during manual setup is weak or non-ideal.

In an effort to address these problems, previous attempts have been made to monitor tracking quality. One well known and commonly used quality tracking solution is referred to as Trace-Minus-Retrace (TMR). In carrying out TMR during a bi-directional scan, from each sample data point of a series of sample data points obtained at desired spaced apart locations along the sample during the trace scan made in one direction, subtract a sample data point of a second series of spaced apart sample data points obtained during the retrace scan made along the same scan line in the opposite direction with the retrace data point located at about the same position on the sample as the trace sample data point. The resultant series of difference values are supposed to be indicative of tracking quality along the entire length of the scan line that was bi-directionally scanned. Where differences are large, TMR infers tracking quality is poor and vice versa where differences are small. Importantly, the technique is compromised if the trace locations do not align (i.e., are offset) with the retrace locations which results in the subtraction being imperfect, and often nonsensical. The reason for the problem is that TMR must compare trace and retrace data at substantially the same location. Even small shifts in the location of features between the trace and retrace can cause it to fail. This means that the TMR method must align the features of the trace scan and retrace scan with high accuracy. Non-linearity, drift and hysteresis in the scanner can make this process-difficult if not impossible. The core problem is that the algorithm requires accurate knowledge of the lateral position of a specific feature to calculate a meaningful metric.

Figure 25:
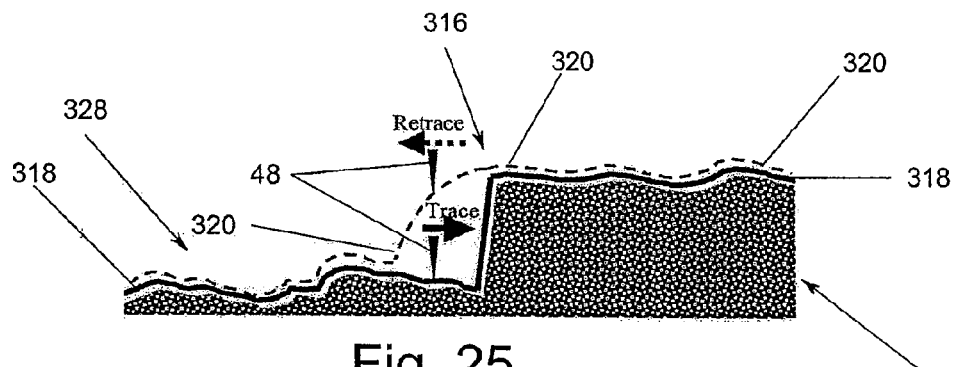
FIG. 25 is a schematic view of a section of a sample illustrating a break in the interaction between a tip and the sample on retrace.

For example, FIG. 25 illustrates part of the topography of a sample 38' that has a step 316 of relatively pronounced height or roughness. During the trace pass of the bi-directional scan 328, tracking is good as the path 318 the tip 48 of the probe travels along the surface of the sample during the trace pass generally matches sample surface topography. However, during the retrace pass in the opposite direction, tracking becomes poor as the tip 48 essentially parachutes off the step 316 because the tip 48 is out of contact with the sample several nanometers as shown by the dashed line path 320 in FIG. 25 before landing back on the sample. More particularly, as the tip ceases to interact with the sample, the probe starts to oscillate as the control system operates to return to the setpoint by narrowing probe-sample separation to cause the probe to again interact with the sample.

Figure 26:
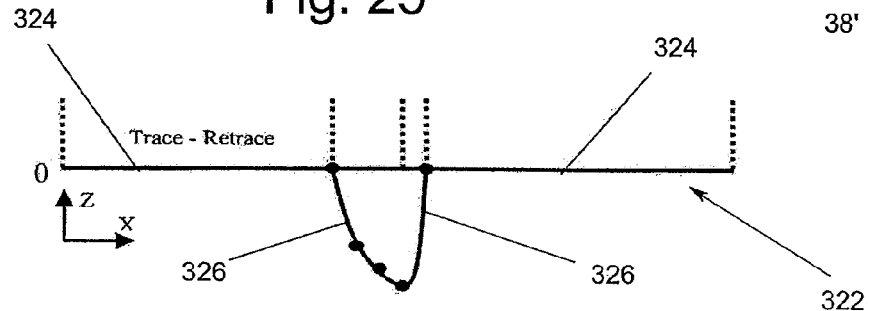
FIG. 26 is a graph of the output generated by TMR for the sample shown in FIG. 25.

FIG. 26 is a plot 322 of the results of applying TMR to the corresponding sets of trace and retrace data points generated from the trace and retrace passes of the bidirectional scan depicted in FIG. 25. Where tracking is good, TMR produces virtually no difference in the corresponding values of both sets of data points, producing the flat line regions 324 shown in the plot 322. However, where tracking is poor, namely in the region of the abutment 316 where the tip 48 parachuted off the sample 38' during the retrace pass, the differences between corresponding trace and retrace data points produce a curve 326 that deviates from the flat line plot regions 324 dipping negatively below the rest of the plot 322. Using TMR, these negative difference values that produced curve 326 correctly indicate poor tracking in the area where the parachuting occurred.

However, as noted above, since TMR requires the location of corresponding trace and retrace sample data points to match, any mismatch, mislocation or misalignment that causes data points not to match up will induce TMR error that can wrongly indicate poor tracking quality when in fact just the opposite is the case. Unfortunately, since many types of piezoelectric tube scanners exhibit nonlinear behavior during scanning, these nonlinearities can cause the actual trace and retrace data point locations to differ leading to TMR error. In an effort to minimize nonlinearity induced data point location mismatch error, nonlinear piezoelectric scanners are frequently calibrated using a multipoint calibration scheme. To further combat nonlinearity induced data point mismatch error, software, such as of the type disclosed in U.S. Pat. No. 5,376,790, is often employed during scanning to try to compensate for any such nonlinearity. Despite these efforts and even when closed loop feedback control is employed, enough residual data point mismatch error occurs that TMR quality tracking determinations are not always reliable.

Figure 27A:
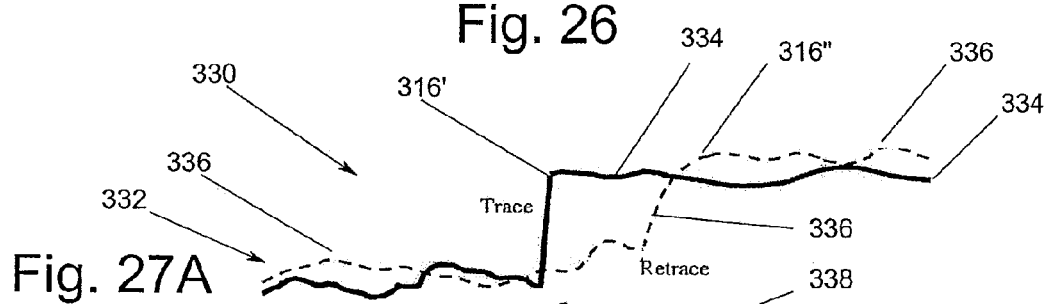
FIG. 27A is a graph of an offset that may occur during collecting trace minus retrace data.
Figure 27B:
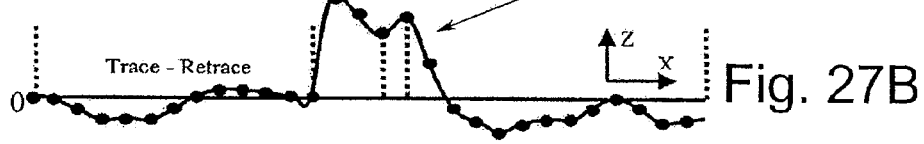
FIG. 27B is a plot of TMR corresponding to FIG. 27B, illustrating a limitation of TMR.

For example, FIG. 27A presents a plot 330 depicting the results of a bidirectional scan 332 of the surface topography of the same sample 38' shown in FIG. 25. However, in this example, scanner nonlinearity causes TMR to incorrectly indicate tracking was worse than it actually was. This is because the subset of sample data points depicting the path 334 traveled along the abutment 316' during retrace are offset or shifted in the X-direction from where they should be relative to the sample data points depicting the retrace path 336 traveled in the opposite direction along this same region 316". As a result of scanner nonlinearity induced data point mismatch error, TMR in this case provides a false negative result in FIG. 27B because its difference output plot 338 shows poor tracking quality differences where none should actually exist.

At present, these problems have made TMR unsuitable for use in many, if not most, situations where open loop feedback control is employed, usually because of the adverse impact of scanner nonlinearities during operation. In some of these situations, closed loop feedback control works because its increased tip positional control accuracy reduces scanner nonlinearity induced data point mismatch error to an acceptable level. Unfortunately, there are still many instances where TMR is still unsuitable including instances where even the residual mismatch error still remaining after implementing closed loop control is still too great as well as other instances where the sample surface is too rough or where variations in topography are too pronounced.

Figure 28:
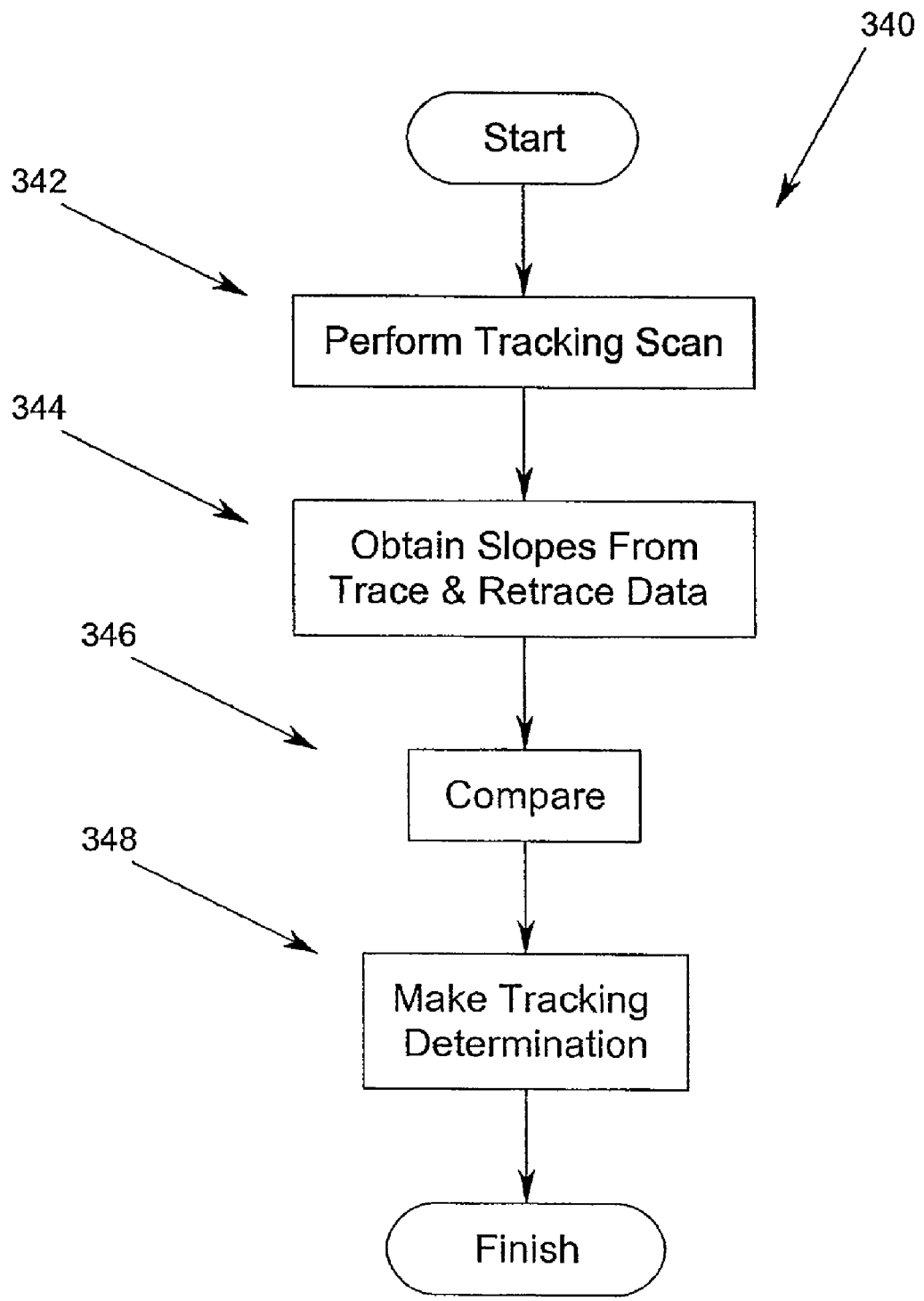
FIG. 28 is a flow chart of a preferred tracking qualification algorithm.

FIG. 28 presents a flowchart 340 illustrating a preferred method of tracking in accordance with the present invention that overcomes most, if not all, of the deficiencies that characterize TMR tracking determination. In the implementation of the tracking method depicted in FIG. 28, sample data point slopes 344 obtained from sets of sample data points generated during the trace and retrace passes of a bidirectional tracking scan 342 are compared 346 in making a tracking determination 348 whether tracking quality is good, e.g., acceptable, or poor, e.g., unacceptable.

Importantly, in the present algorithm, mismatch errors can not be present because, unlike TMR, corresponding data points associated with particular scan locations (i.e., x positions) are not compared, only raw data independent of the actual coordinates of its corresponding scan location is compared. In other words, the data comparison is independent of the exact location at which the data was acquired.

Data in SPM measurements typically consists of a vertical data value (Z) for a range of XY values. The vertical data values are often topographic heights, but can also be a measurement of any interaction between the probe and sample, as described previously. The localized slopes for the tracking algorithm may be calculated from the scan data by any suitable method. For example, local slopes may be computed dividing a difference in the vertical data (rise, $\Delta Z$) between two points by the corresponding difference in the horizontal position (run, $\Delta X$). The slope can also be calculated by fitting a curve between a plurality of data points and then calculating the local derivative of the fit curve. A further simplification can be obtained if the vertical data points are evenly spaced in the X direction. In that case, the horizontal separation $\Delta X$ can be considered a constant and the slope can be determined by simply measuring vertical inter-pixel distances ($\Delta Z$). The slopes can be calculated using adjacent pixels, as used in the preferred embodiment, or pixels separated by any number of intervening pixels. The only requirement is that the local slopes be calculated over a distance small enough to detect the features of interest on a sample. In the preferred embodiment we calculate the slopes using the difference in Z-data values from adjacent pixels.

By using localized slopes obtained from trace and retrace sample data points, the method of the invention beneficially minimizes and preferably eliminates impact from data point mismatch error. As a result, scanner induced nonlinearities have such a negligible effect that they do not adversely impact tracking determination. In addition, a tracking determination method implemented in accordance with the present invention is robust in that it is insensitive to tilt error such that tilt correction need not be performed prior to or while practicing the method in order to make a tracking determination. This also means, for example, that sample leveling is advantageously not required before or while making a tracking determination.

Figure 29:
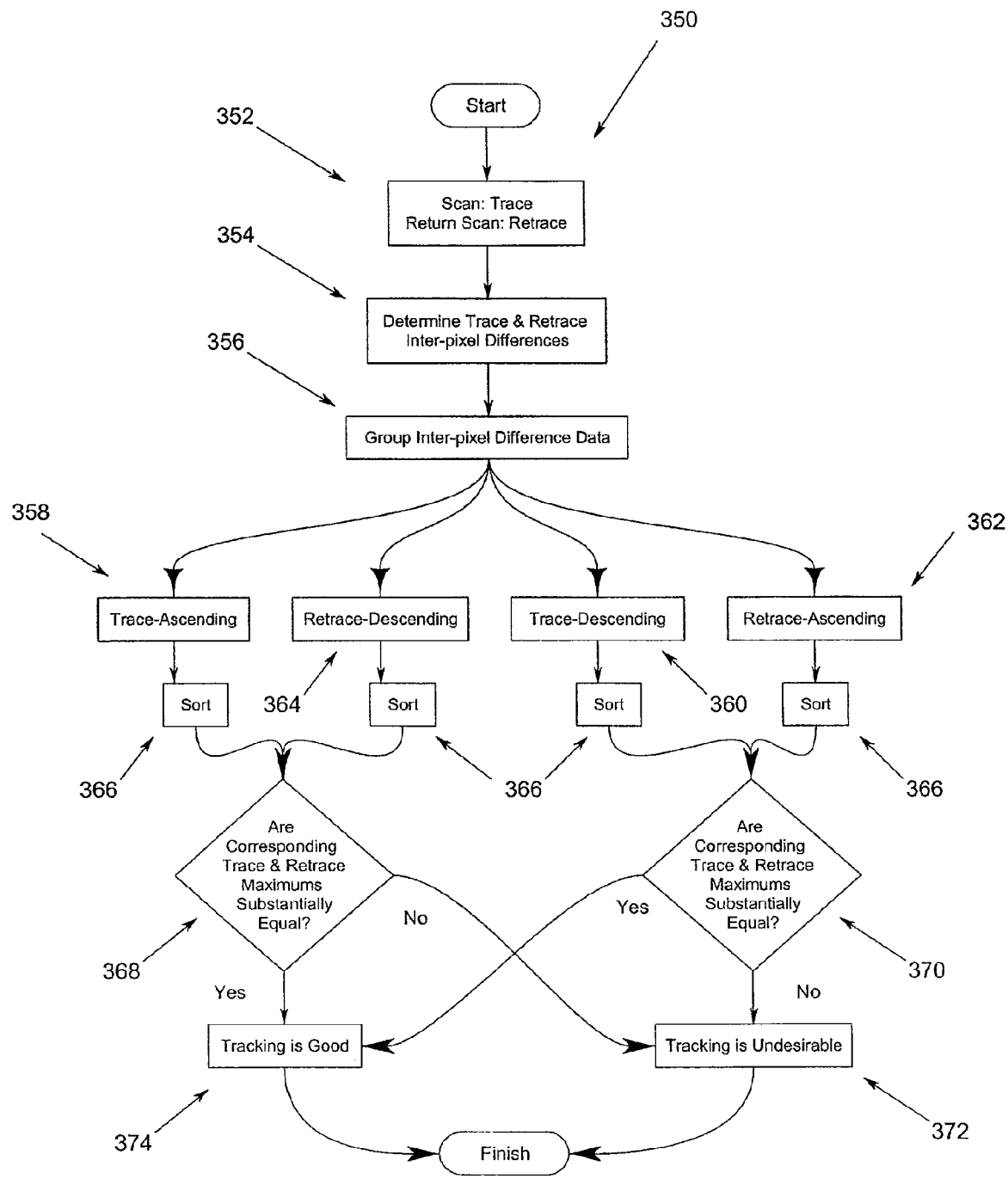
FIG. 29 is a more detailed flow diagram of a preferred tracking qualification algorithm.

FIG. 29 illustrates a flowchart 350 depicting another preferred implementation of the tracking method of the invention. In this currently preferred method implementation, a bidirectional scan 352 is also carried out, such as during pre-scan or even during actual measurement instrument operation (e.g., when actually imaging a sample) such that a trace scan pass and retrace scan pass are performed along a single common scan line of the sample. Thereafter, inter-pixel differences of data from the same scan-pass are determined 354 for the sample data obtained during both the trace scan pass and the retrace scan pass. Notably, the data values of interest (sometimes referred to herein as "samples") for making a tracking quality determination according to this preferred embodiment are localized measurements of the slopes traversed by the tip.

In a preferred inter-pixel difference determination method implementation that preferably is capable of being carried out in step 354, adjacent consecutive sample data values, i.e., pixel values, for at least a plurality of consecutive data pairs of a scan pass (preferably the same scan pass) are subtracted to obtain the difference between them. Thus, for at least this particular case, the inter-pixel difference corresponds to tip travel slope in the localized region of the path traveled by the tip between the two sample data values of the particular scan pass from which the difference was determined. In a currently preferred inter-pixel difference determination method carried out in step 354, inter-pixel difference data are calculated for all consecutive pairs of adjacent sample data values (for example, N-1 samples, where N is the pixels per line, e.g., 256, 512, etc.) for both the trace scan pass and retrace scan pass of a bi-directional tracking scan that preferably is the current bi-directional tracking scan. The resultant inter-pixel data is kept together or otherwise grouped together based on the scan pass from which it originated.

Figure 30:
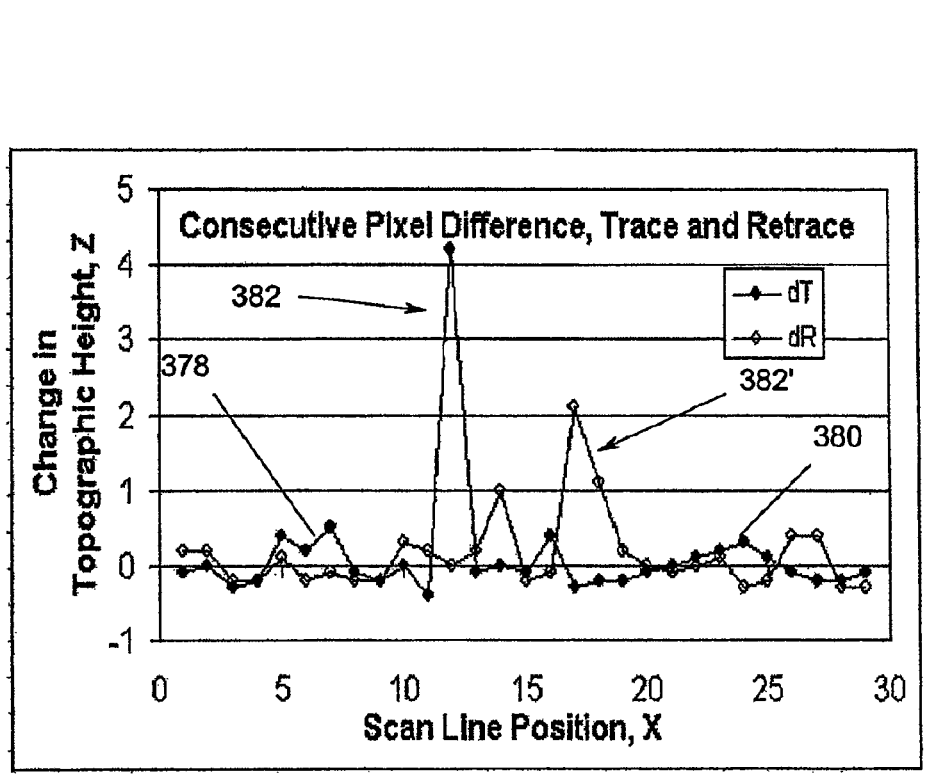
FIG. 30 is a plot of consecutive pixel difference data, according to the preferred embodiment.

To provide a better idea of at least one advantage determining such inter-pixel difference data provides, reference is additionally made to FIG. 30 which illustrates a graph 376 showing two plots 378 and 380 of calculated inter-pixel difference data with one plot 378 displaying trace inter-pixel difference data and the other plot 380 displaying retrace inter-pixel difference data. The inter-pixel difference data for each plot 378 and 380 is arranged by scan line position or location, which in this particular example is disposed along the X-axis, e.g., in X-direction.

Though shown for consecutive pixel differences, the method of the preferred embodiment is operable when considering non-consecutive pixel differences as well as alternately analyzed sample selections.

Referring once again to the preferred implementation of the tracking determination method depicted in FIG. 29, the inter-pixel difference data, though already based on whether it originated from data generated during the trace or retrace scan pass, is further grouped into four separate categories 358-362. For example, in the preferred method implementation shown in FIG. 29, the trace scan pass difference data is divided into two groups with one group holding all ascending slope values, i.e., the positive values, and the other group holding all descending slope values, i.e., the negative values. The same re-grouping is done for the retrace scan pass difference data. For example, in the preferred implementation of the method illustrated in FIG. 29, all of the trace inter-pixel difference data having a positive or ascending slope is put in the Trace-Ascending group or bin 358, all of the trace inter-pixel difference data having a negative or descending slope is put in the Trace-Descending group or bin 360, all of the retrace inter-pixel difference data having a positive or ascending slope is put in the Retrace-Ascending group or bin 362, and all of the retrace inter-pixel difference data having a negative or descending slope is put in the Retrace-Descending group or bin 364.

Thereafter, each newly grouped set of inter-pixel difference data is sorted 366 preferably by arranging the inter-pixel difference data values within each group 358-364 from highest value to lowest value, i.e. in descending order. In a currently preferred implementation, each value of the data within the groups containing negative values, e.g., groups 360 and 364, is converted to its absolute value preferably before sorting takes place. If desired, this can also be done after sorting and can also be done for the data in all of the groups 358-364.

Figure 31:
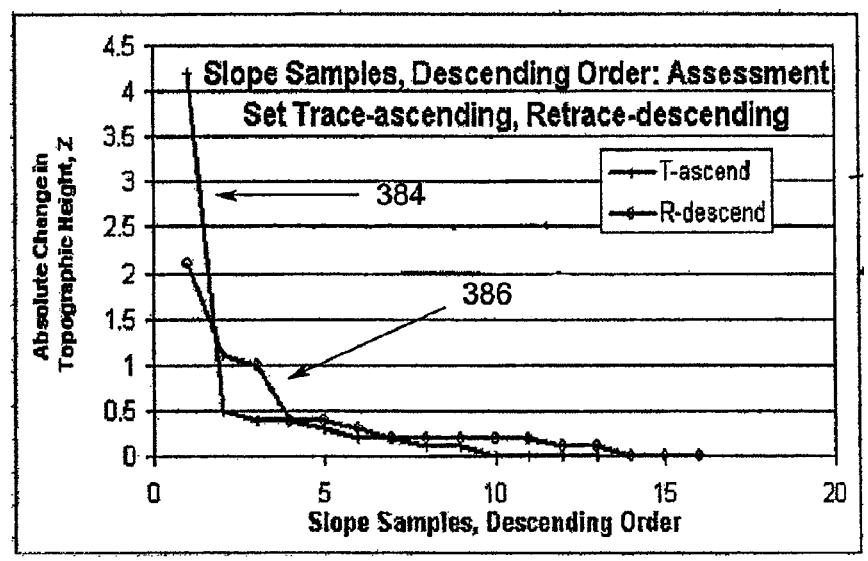
FIG. 31 is an assessment plot of the slope samples, according to the preferred embodiment.

Once sorted, one or more comparisons, preferably a plurality of comparisons 368 and 370, are made to determine one or more tracking metrics that are or represent tracking quality determinations. For example, the extreme values of the slope in the Trace scan can be compared to the extreme values of the slope in the Retrace scan. In a more sophisticated implementation, the maximum value or maximum values of the Trace-Ascending and Retrace-Descending inter-pixel difference data values are compared against one another such as in accordance with the corresponding Trace-ascending and Retrace-descending plots 384 and 386 shown in the graph 388 of FIG. 31. Where one or more maximum inter-pixel difference (slope) values of different plots significantly differ for the larger absolute slope values, as are located at the left side of plot 388 in FIG. 31, poor tracking can be inferred. Conversely, where there is little or no difference, e.g., 10% or less difference, in corresponding maximum values, good tracking can be inferred.

When tracking is ideal, the two maximum absolute slopes agree, so the ratio is 1. In the case in which descending slopes are less steep than ascending slopes, i.e., an example of poor tracking, the ratio of this first metric is lowered from 1 toward 0.

This simple ratio has tremendous power compared to the prior art because it is self-normalizing. That is the metric scales substantially only with the quality of the tracking, and is substantially independent of the surface roughness of the sample. This is in stark contrast with the conventional TMR metric in which the amplitude of the Trace Minus Retrace signal depends on the height of the feature being scanned in addition to the quality of the tracking. Since the tracking metric in the current invention is related to the ratio of the local surface slopes, it normalizes out variations in sample topography. By taking the ratio of slopes, the height of the local topography is divided out. More specifically, the ratio always tends towards one when the tracking is perfect, independent of the sample topography.

This self-normalizing feature allows the tracking metric to be used as a fixed reference for automatically optimizing AFM operation. The self-optimizing AFM can always target achieving a value of the tracking metric above a certain threshold. For example, we have found that a tracking metric above 0.85 (for example, based on a comparison of data (e.g., slopes) corresponding to the trace and retrace scans) generally indicates a high quality image, over a wide range of sample types and sample roughnesses. Using this property, the inventors have developed the algorithms described elsewhere in this specification to automatically adjust the scan control parameters of the SPM until the tracking metric is optimized or at least above a desired threshold value.

Note that it is also possible to select a range of slope measurements to improve the performance of the algorithm, especially in the presence of noise. A noise spike can give a spuriously large value of absolute slope that exceed the true sample slope. For this reason it may be desirable to add a noise rejection filter on the slope data set or use a subset of the slope data to avoid the extreme values that may result from noise spikes. One possibility, for example, is to exclude the top 5% of slope values as a means of rejecting noise spikes. In some cases, using a larger range of local slope values provides data averaging that also suppresses the effect of noise spikes. For example, using a range of 75%-100% of the maximum slope includes the extreme value and a neighboring range.

It is also possible in some circumstances to use a noise rejection filter that rejects slopes that are more than some number K times the standard deviation of the slope distribution. A reasonable value for K is 2-3.

Notably, this metric qualifies tracking with respect to the largest slopes occurring in an assessment data set, regardless of the absolute slope magnitudes present. Notably, even when scanning is nonlinear (i.e., evenly timed data acquisition does not yield evenly spaced sample sites), the variation in $\Delta x$ is proportional to the variation in scan velocity, which typically is a small fraction of average scan velocity.

If desired, a double check can be provided to confirm. For example, with additional reference to the graph 390 of FIG. 32, the maximum values of the Trace-descending and Retrace-ascending groups 392 and 394 can be compared in the same manner. Tracking is good if they are substantially the same or fall within a certain acceptable limit or tolerance of one another and tracking is poor where the differences between corresponding maximum values are too great.

Figure 32:
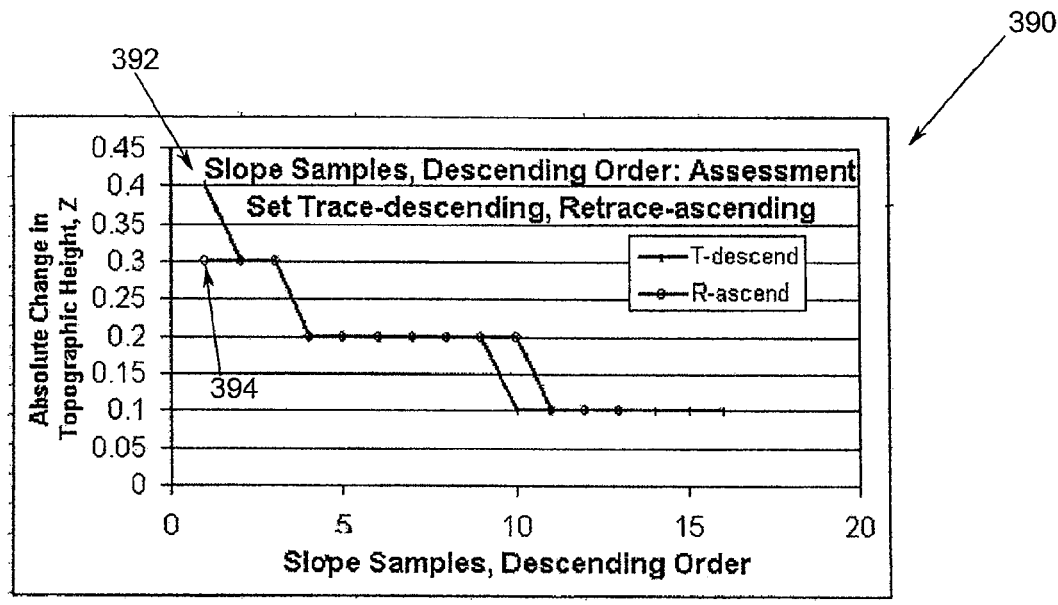
FIG. 32 is an assessment plot similar to FIG. 31, illustrating trace descending and retrace ascending data.
Figure 33:
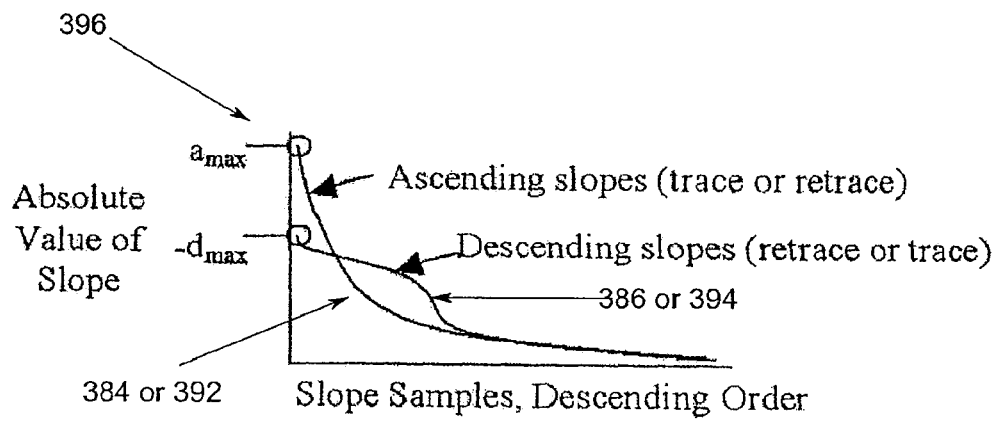
FIG. 33 is plot comparing ascending slopes and descending slopes.

The graph 396 of FIG. 33 also illustrates this, perhaps a bit more simply and clearly than, for example, FIG. 32 does. Where the ascending maximum value, $a_{max}$, is larger than the descending maximum value, $-d_{max}$, by too great an amount, tolerance or percentage, tracking is determined to be poor or unacceptable 372 (FIG. 29). Conversely, where $a_{max}$ and $-d_{max}$ are the same or substantially the same such that they are within a desired amount, tolerance or percentage, including of one another, then tracking is determined to be good or acceptable 374 (FIG. 29).

In one preferred embodiment, an average can be taken of both of these tracking metrics to obtain a relative tracking metric particularly useful, for example, in determining tracking quality where the sample surface is relatively smooth or flat. In another preferred embodiment, where the tip apex approach slopes differ along the fast scan axis, the steeper slope, producing the lower metric value, is the more accurate tracking indicator and is relied on preferentially. Other embodiments average the higher slope values and/or exclude some of them for signal-to-noise improvement. Another slope sample based tracking metric is absolute in that it provides the maximum descending slope observed in either of the first and second assessment dataset. This is provided as an angle related to the instrument Z-axis. Specifically, the arctangent is taken of the largest falling difference, $-\Delta z_{min}$ divided by the average interpixel travel distance, $\Delta x=$(scan range)/n. With this metric, the length of the line scanned and the number of samples taken enter the calculation.

Figure 34:
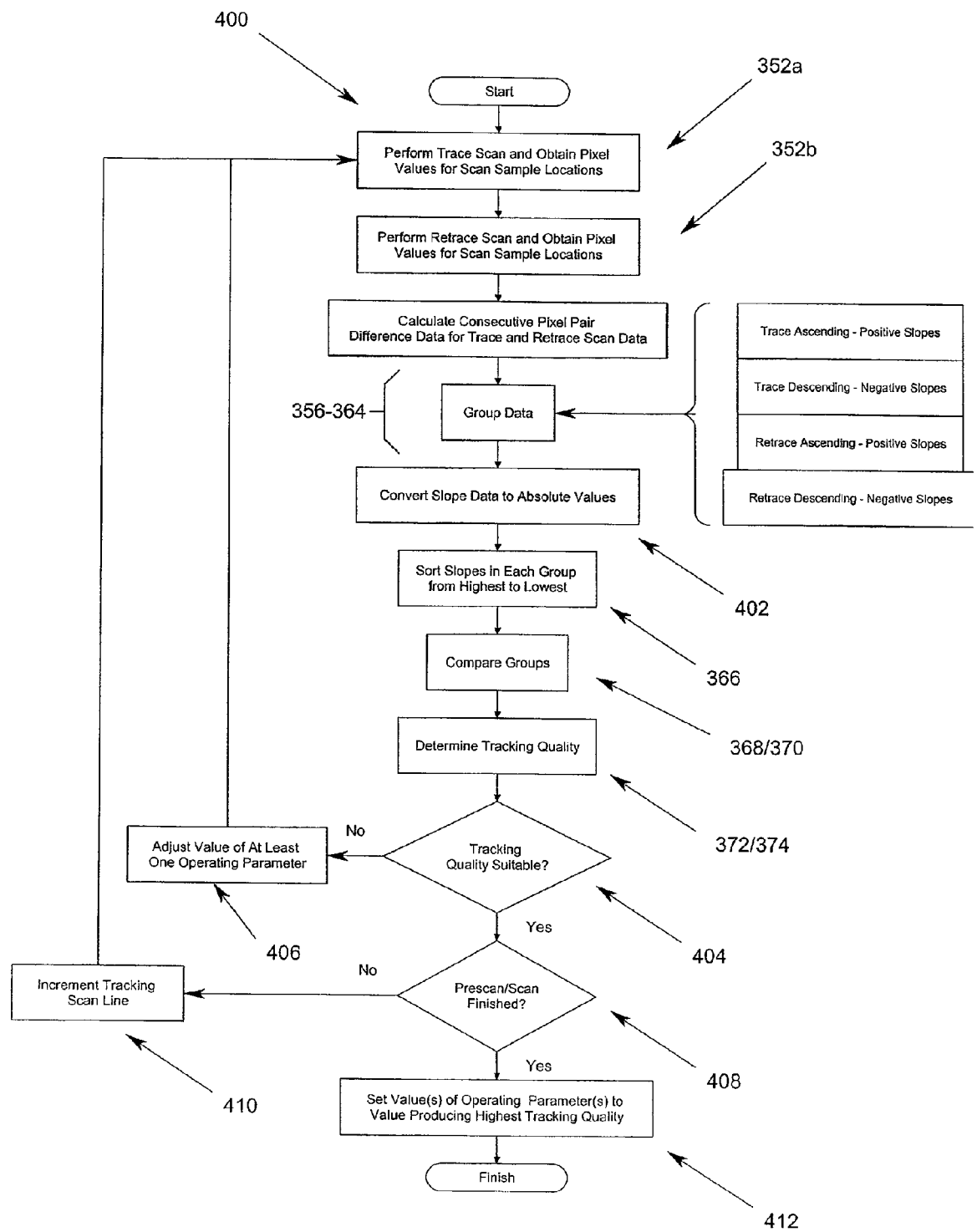
FIG. 34 is a flow chart of an alternate embodiment of the tracking qualification algorithm, according to the preferred embodiments.

FIG. 34 illustrates a flowchart 400 of another preferred implementation of a tracking quality method of the present invention where tracking quality is employed as a control variable that is used to adjust and preferably optimize a value of at least one operating parameter, such as scan speed or scan rate, operating setpoint, and/or one or both gains. The optimal value of the parameter or parameters being optimized is set at the value when tracking quality is highest or best. In another preferred method implementation, one or more tracking scans can and preferably are repeated using different parameter values until tracking is suitable. Thereafter, the parameter is either set to that value or to the value at which it was set during the particular bi-directional tracking scan that produced the best tracking or highest tracking quality. Where an actual imaging scan is being performed, the parameter value is simply updated to correspond to the value that produced the last best tracking quality.

In the method depicted in FIG. 34, slopes are converted into absolute values in step 402 and a check is made in step 404 whether the tracking quality output in step 372 or 374 is suitable. If tracking quality is not suitable, then the value of the particular operating parameter being optimized is adjusted, such as by incrementing it, etc., before the bi-directional tracking scan is performed using the adjusted operating parameter value(s). Preferably, the scan is performed again at the same scan line, but can be performed at a different scan line location, if desired. If tracking quality is suitable, a check is made in step 408 to determine whether the pre-scan or actual image scan is complete. If not, the bi-directional scan line setting is incremented to the next scan line and the whole process preferably is repeated.

In addition to the aforementioned, the n-th steepest ascending slope and the n-th steepest descending slope can be compared with the comparison made based on the absolute value of at least the negative slope. In another preferred tracking metrics implementation, the n-steepest ascending slopes can be averaged and compared against a corresponding average of n-steepest descending slopes.

In another preferred implementation, curve fitting can be employed, such as where it is desired to compare curves fitted to some or all of the ascending slope data against corresponding descending slope data. In one preferred implementation, a polynomial fit is made to the n-largest ascending slope samples plotted in descending order by size. A polynomial fit is likewise made to the n-largest descending slope samples also plotted in descending order by size. Thereafter, each fit as applied to the maximum slope sample is used as its substitute in tracking metric determinations. In some instances, it may be desired to filter at least some of the slope data. For example, if desired, one or more of the steepest ascending and descending slope values can be thrown out or otherwise excluded before determining any one of the tracking metrics discussed above.

Although the best mode contemplated by the inventor for carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims.

What is claimed is:

1. A method of performing setup of a probe-based measurement instrument having a probe and a position-affecting controller comprising:
   (a) automatically determining at least a plurality of setup operating parameters of the probe-based measurement instrument;
   (b) scanning the probe over a sample using the at least plurality of setup operating parameters determined in step (a); and
   (c) obtaining sample-related data therefrom;
   and wherein none of the setup operating parameters are empirically determined prior to initiating the scanning step.

2. A method of performing setup of a probe-based measurement instrument having a probe and a position-affecting controller comprising:
   (a) manually initiating automatic determination of at least a plurality of setup operating parameters of the probe-based measurement instrument;
   (b) scanning the probe over a sample using the at least plurality of setup operating parameters determined in step (a);
   (c) obtaining sample-related data therefrom, and wherein the automatic setup operating parameter determination step (a) comprises (1) performing automatic parameter tuning, (2) determining a plurality of probe-sample pre-engagement settings, (3) performing automatic gain adjustment, (4) performing a pre-scan of the sample, and thereafter (5) optimizing at least a plurality of pairs of operating parameters.

3. The method of claim 2, wherein the automatic parameter tuning step (1) comprises (i) oscillating a cantilever of the probe, and (ii) determining a resonant or natural frequency of the cantilever.

4. The method of claim 3, wherein scan size is set to zero during the automatic parameter tuning step (1).

5. The method of claim 2, wherein the probe-sample pre-engagement settings determination step (2) comprises (i) checking each operating parameter against a corresponding safe operating parameter setting or setting range, and (ii) adjusting each operating parameter outside the safe operating parameter setting or setting range so it the same as the safe operating parameter setting or lies within the safe operating parameter setting range.

6. The method of claim 5, wherein the safe operating parameter setting or setting range for at least a plurality of operating parameters is stored in a lookup table.

7. The method of claim 5, wherein before step (i) the step of checking whether the probe-based measurement instrument has a safe mode and putting the probe-based measurement instrument into safe mode if the probe-based measurement instrument has safe mode capability.

8. The method of claim 5, wherein steps (i) and (ii) are performed for at least ten operating parameters.

9. The method of claim 8, wherein steps (i) and (ii) are performed for determining a safe operating parameter setting for at least integral gain, proportional gain, amplitude noise, scan size, scan rate, number of scan lines, offset voltage, and Z-limit.

10. The method of claim 9, wherein steps (i) and (ii) are also performed for determining a safe operating parameter setting for at least back off percentage, bi-directional pre-scan I-gain, and bi-directional pre-scan P-gain.

11. The method of claim 2, wherein the automatic gain adjustment step (1) comprises (i) ramping up an integral gain and a proportional gain, (ii) monitoring amplitude noise, (iii) stopping gain ramping when a noise threshold is reached, and thereafter (iv) setting an integral gain operating parameter and (v) setting a proportional gain operating parameter.

12. The method of claim 11, wherein the integral gain operating parameter set in step (iv) and is based on the integral gain when gain ramping is stopped in step (iii) and the proportional gain operating parameter set in step (v) is based on the proportional gain when gain ramping is stopped in step (iii).

13. The method of claim 12, wherein gain ramping is stopped in step (iii) when the onset of feedback loop oscillation is detected.

* * * * *